(12) United States Patent
Densham et al.

(10) Patent No.: US 7,904,301 B2
(45) Date of Patent: Mar. 8, 2011

(54) PROCESSING DIGITAL DATA

(75) Inventors: Rodney Hugh Densham, Charlbury (GB); William Edmund Cranstoun Kentish, Chipping Norton (GB); Nicholas John Haynes, Enstone (GB); Peter Charles Eastty, Eynsham (GB)

(73) Assignee: Sony Europe Limited, Weybridge (GB)

( * ) Notice: Subject to any disclaimer, the term of this patent is extended or adjusted under 35 U.S.C. 154(b) by 1374 days.

(21) Appl. No.: 10/526,573

(22) PCT Filed: Aug. 8, 2003

(86) PCT No.: PCT/GB03/03490
§ 371 (c)(1),
(2), (4) Date: Nov. 14, 2005

(87) PCT Pub. No.: WO2004/023471
PCT Pub. Date: Mar. 18, 2004

(65) Prior Publication Data
US 2006/0143018 A1    Jun. 29, 2006

(30) Foreign Application Priority Data
Sep. 6, 2002   (GB) .................................. 0220788.4

(51) Int. Cl.
*G10L 19/00* (2006.01)
(52) U.S. Cl. ........................................ 704/500; 704/501
(58) Field of Classification Search .................. None
See application file for complete search history.

(56) References Cited

U.S. PATENT DOCUMENTS

| | | | |
|---|---|---|---|
| 4,266,243 A | 5/1981 | Shutterly | |
| 6,023,490 A * | 2/2000 | Ten Kate | 375/240 |
| 6,041,160 A | 3/2000 | Yagasaki et al. | |
| 6,081,784 A | 6/2000 | Tsutsui | |
| 6,154,484 A * | 11/2000 | Lee et al. | 375/130 |
| 6,788,710 B1 * | 9/2004 | Knutson et al. | 370/535 |
| 6,792,542 B1 * | 9/2004 | Lee et al. | 726/1 |
| 2002/0108043 A1 | 8/2002 | Tanaka | |

FOREIGN PATENT DOCUMENTS

| | | |
|---|---|---|
| EP | 0 955 634 | 11/1999 |
| EP | 0 971 350 | 1/2000 |
| EP | 1 189 372 A2 | 3/2002 |
| GB | 2 369 022 | 5/2002 |
| JP | 10-135944 | 5/1998 |
| JP | 2000 123481 | 4/2000 |
| JP | 2001-118330 | 4/2001 |
| JP | 2001-156772 | 6/2001 |
| JP | 2002-062888 | 2/2002 |
| WO | WO 02/51150 | 6/2002 |

\* cited by examiner

*Primary Examiner* — Brian L Albertalli
(74) *Attorney, Agent, or Firm* — Oblon, Spivak, McClelland, Maier & Neusadt, L.L.P.

(57) ABSTRACT

An original digital audio signal represents unimpaired audio information. The digital audio signal is compressed and encrypted without substantial impairment to produce a first audio signal. A second, unencrypted, audio signal is produced. The first and second audio signals are combined. Preferably the first audio signal is losslessy compressed. The second audio signal may be an impaired version of the original digital audio signal.

87 Claims, 15 Drawing Sheets

PROCESSING DIGITAL DATA

BACKGROUND TO THE INVENTION

1. Field of the Invention

The present invention relates to: a method of processing digital data; apparatus for processing digital data; a computer program for processing digital data; a data format; a method and apparatus for restoring the processed data; and a corresponding program. Some aspects and embodiments of the invention relate to processing audio signals, but it will be appreciated that in other aspects and embodiments the invention may be applied to other data. The other data may be audio/visual data, video data, still image data, a computer program, and multimedia data amongst other examples.

2. Description of the Prior Art

EP-A-1,189,372 (Matsushita) discloses many techniques for protecting audio signals from misuse. In one technique, audio is compressed and encrypted before distribution to a user. The user needs a decryption key to access the audio. The key may be purchased by the user to access the audio. The audio cannot be sampled by a user until they have purchased the key. Other techniques embed an audible watermark in an audio signal to protect it. In one technique, an audio signal is combined with an audible signal (also referred to as a watermark) according to a predetermined rule. The watermark degrades the audio signal. The combination is compressed for transmission to a player. The player can decompress and reproduce the degraded audio signal allowing a user to determine whether they wish to buy a "key" which allows them to remove the watermark. The watermark is removed by adding to the decompressed degraded audio signal an equal and opposite audible signal. The watermark may be any signal which degrades the audio. The watermark may be noise. The watermark may be an announcement such as "This music is for sample playback".

Co-pending UK patent application 0202737.3 (Sony United Kingdom Limited) filed 6 Feb. 2002 discloses a method of modifying a compressed video bitstream for applying a watermark to the video. The bitstream includes digital codes representing the compressed video. At least one digital code is selected. The code occupies a part of the bitstream which is to contain at least one watermark code which represents a watermark perceptible in the information signal. The selected, digital code(s) are removed from the said part of the bitstream. The watermark code(s) are put in the said part of the bitstream in place of the selected code(s). The number of bits of the selected code(s) removed from the said part of the bitstream is greater than or equal to the number of bits of the said watermark code(s) put in the said part. The removed selected code(s) are encrypted and appended to an end of the bitstream and/or placed in watermark user data fields created in the bitstream.

WO 02/51150 discloses a system in which an audio signal is transmitted in the blanking period of a video signal. Compressed video information and compressed audio information are reproduced from a DVD. The video is decoded by a computer. The computer encrypts the decoded video. The computer also encrypts the compressed audio. The computer outputs the encrypted video and the encrypted audio via a cable.

U.S. Pat. No. 6,041,160 combines, in a multiplexer, encoded audio information with compressed video which has been at least partially scrambled.

US-A1-2002/0108043 generates MPEG encoded data which comprises audio and video information. A switch has two inputs: one is connected to receive the MPEG encoded data directly and the other via an encrypting device. The switch selects one or the other input to generate partly encrypted MPEG data.

U.S. Pat. No. 4,266,243 comprises a mixer which combines composite video signals with scrambled and compressed audio signals. The audio signals are scrambled in a scrambling device and then the scrambled audio is compressed in a compressor before being applied to the mixer.

GB-A-2 369 022 (Radioscape Limited) describes the delivery of audio files by digital radio, An incomplete and/or partly corrupted audio file in compressed form, is transmitted as a first data stream by digital radio "in the clear" (i.e. unencrypted). An audio file of n frames is made incomplete by removing n-n frames, leaving m to be transmitted. The file is corrupted by corrupting m-p of those frames leaving p uncorrupted frames to be transmitted "in the clear".

A second data stream referred to as a "delta stream" comprising the n-m removed frames and the m-p original (uncorrupted) frames totalling n-p frames. Those n-p frames are encrypted. In one example those n-p encrypted frames are embedded within extra space allocated within the audio frames themselves.

The receiver is able to reassemble the original audio file by reinserting the n-m removed frames from the second stream into the first data stream and replacing the m-p corrupted frames in the first data stream with the m-p original frames taken from the second stream.

SUMMARY OF THE INVENTION

According to a first aspect of the present invention there is provided method of processing a digital audio signal comprising the steps of:

a) providing a digital audio signal representing unimpaired audio information;

b) compressing and encrypting the said digital audio signal to produce a first, compressed and encrypted, audio signal the audio information of which is substantially unimpaired compared to that of the said digital audio signal;

c) producing an unencrypted second audio signal; and d) combining the said first and second audio signals to produce a combined signal comprising the said compressed and encrypted first audio signal and the unencrypted second audio signal.

The digital audio signal is preferably losslessly compressed but it may be compressed by a "lossy" process. Thus the first compressed and encrypted audio signal is preferably an unimpaired representation of the digital audio signal due to the loss less compression, but may be a substantially unimpaired representation to the extent the lossy compression has resulted in the loss of some data.

Because the first audio signal is (substantially) unimpaired, it is recoverable simply by separating it from the second audio signal and decrypting it, which is a relatively straight forward process. It does not require reassembling using data from another signal (c.f. Radioscape) which is a relatively complex process.

Because the first audio signal is encrypted it is secure from unauthorised use.

The second signal is unencrypted and thus can be reproduced easily.

Preferably, the first audio signal is compressed and subsequently encrypted. Most preferably, the encryption algorithm used to encrypt the first audio signal does not significantly increase the number of bits of the first audio signal. A small increase in the number of bits may be acceptable.

The compression reduces the amount of data and the encryption transforms the compressed data into noise. The first signal then appears to a user to be noise in the combined signal.

The second signal may be an impaired version of the (unencrypted and uncompressed) digital audio signal or a filter audio signal.

Where the second signal is an impaired version of the original digital audio signal, a user may listen to the second signal (which is not encrypted) to determine whether they wish to access the original digital audio signal. If they do wish to access the original digital audio signal, that signal can be reproduced from the compressed and encrypted first signal. The original digital audio signal is kept secure from misuse in that the user cannot access it without a decryption key whilst the impaired second signal can be used by the user without decryption.

The second signal may be an impaired and compressed version of the first signal in which case a user needs a suitable decompressor to access the impaired signal.

A second aspect of the present invention provides, in a system comprising a transaction server and at least first and second clients, a method of transferring a digital signal representing content from the first client to the second client, the method comprising the steps of:

using the first client to implement the method of said first aspect of the invention to produce the combined signal, and associate an identifier with the combined signal for identifying the combined signal;

providing, to the transaction server, the identifier and at least one key for decrypting the encrypted signal and storing, in the transaction server, the said identifier and the said at least one key;

transferring the combined signal to the second client;

deriving the said identifier associated with the combined signal;

transferring the identifier from the second client to the transaction server;

subject to predetermined conditions being satisfied, transferring from the transaction server to the second client at least one key associated with the said identifier, for decrypting the encrypted first signal; and using the second client to separate the first signal from the second signal and to restore the first signal.

According to a third aspect, there is provided, in a system comprising at least first and second processors, a method of transferring a digital signal representing content from the first processor to the second processor the method comprising the steps of:

using the first processor to implement the method of said first aspect of the invention to produce the combined signal and to associate an identifier with the combined signal for identifying the combined signal;

storing the said identifier;

transferring the combined signal to the second processor;

at the said second processor, deriving the said identifier associated with the combined signal;

subject to predetermined conditions being satisfied, transferring to the second processor at least one key associated with the said identifier, for decrypting the encrypted first signal; and using the second processor to separate the first signal from the second signal and to reproduce the first signal.

A fourth aspect of the invention provides a method of processing a digital signal comprising the steps of providing a first digital signal representing first information, providing a second digital signal, and embedding the first signal in the second signal by replacing Less Significant Bits (LSBs) of the second signal by bits of the first signal and retaining the More Significant Bits (SBs) of the second signal, whereby the first signal occurs as noise in the second signal.

Preferably in the fourth aspect the first signal is a compressed signal and/or an encrypted signal.

A fifth aspect of the invention provides a method of processing a digital signal comprising the steps of providing a first digital signal representing substantially unimpaired first information, the first signal being a compressed and/or encrypted signal, providing an unencrypted second digital signal representing second information, and which is compressed according to a compression format having auxiliary data space, and combining the first signal comprising the said substantially unimpaired first information with the second signal, embedding at least part of the first signal being embedded in the said auxiliary data space of the second signal.

In the fifth aspect, part of the first signal may be appended to the second signal.

A sixth aspect provides a method of processing a digital signal comprising the steps of providing a first digital signal representing first information, providing a second digital signal, and embedding the first signal in the second signal by selecting groups of N samples and distributing over the N samples of each group corresponding sets of M bits of the first signal, where the ratio M/N is an integer fraction.

In the fourth fifth and sixth aspects, the first signal preferably represents a computer program and the second signal preferably represents an audio signal. Thus in an example of the fourth, fifth and sixth aspects a computer program may be combined with a music track the combination being recorded on a recording medium for example a compact disc.

These and other aspects of the invention are set out in the claims to which attention is invited. The features of the claims may be combined in combinations other than those explicitly set out in the claims.

BRIEF DESCRIPTION OF THE DRAWINGS

For a better understanding of the present invention, reference will now be made by way of example to the accompanying drawings in which.

In the Figures, like elements are denoted by like reference signs.

The present invention is described in the following by way of example with reference to audio signals.

Compression and Encryption of Audio Files

Figure 1:
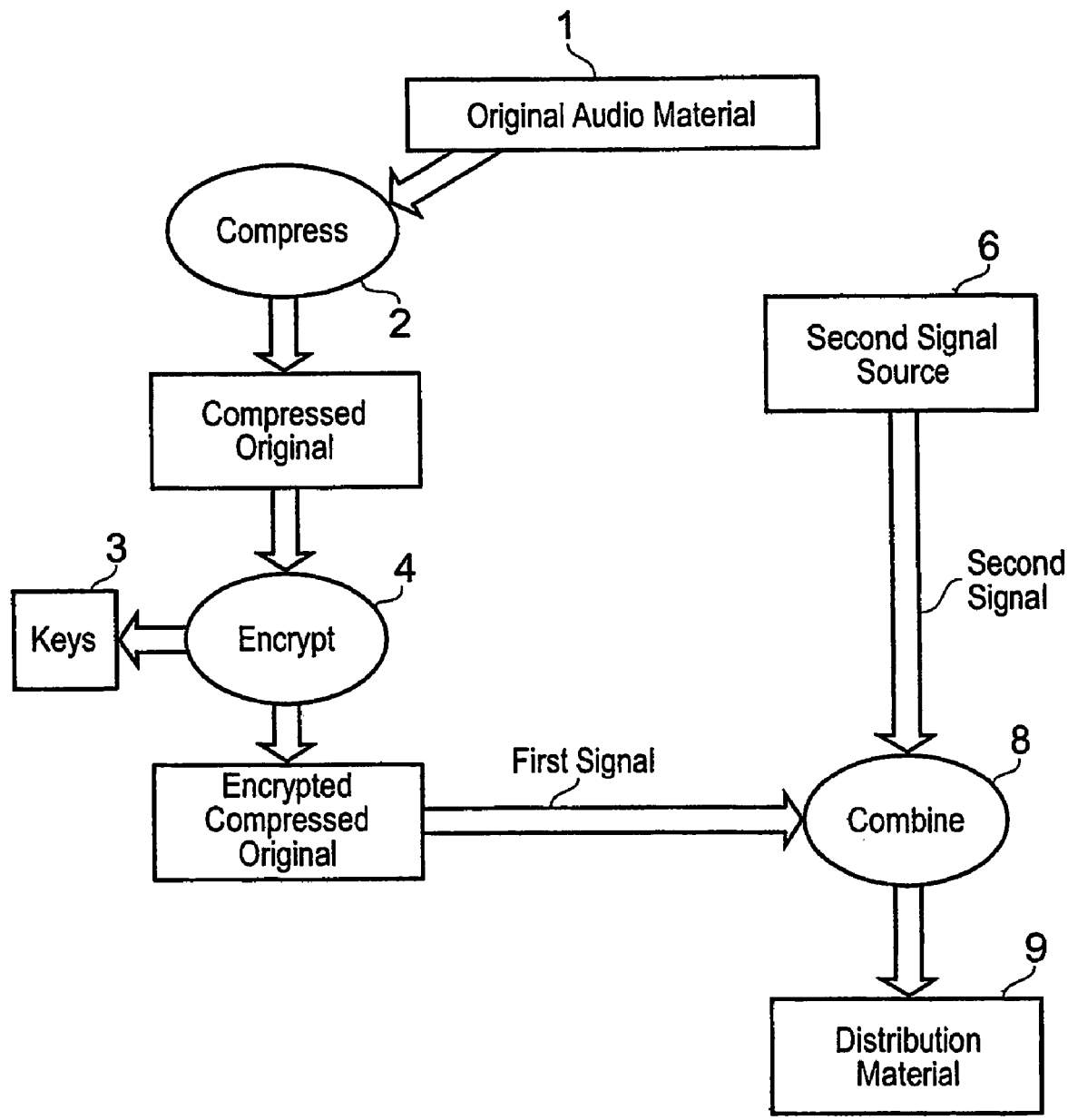
FIG. 1 is a schematic block diagram of a first illustrative system for processing audio signals in accordance with the present invention.

Referring to FIG. 1, a source 1 of original digital audio is provided. The audio in this example is in the form of a file. The digital audio is uncompressed in any suitable format, for example, PCM, WAV, AIFF (Audio Interchange File Format). The digital audio may be in fixed point format or in floating point format. The following description assumes fixed point format, although a section below comments on floating point format. The source may be any suitable source, and in this example may be a computer. The original digital audio is compressed by a compressor 2, which implements a standard lossless compression algorithm to produce a compressed audio file. It will be appreciated that other compression algorithms may be used. The compression achieved by the compressor 2 depends on the content of the audio. The compressed audio is encrypted by an encryptor 4 which implements a standard encryption algorithm which does not significantly increase the size of the compressed audio file to produce a losslessly compressed and encrypted audio file. A small increase in the number of bits may be acceptable. Such an increase may be due to the provision of Cyclic Redundancy Code information for example. Rijndael is one example of such an encryption algorithm: others may be used. The encryption algorithm uses at least one key. The key or keys needed to decrypt the file are securely stored in a store 3 for use in decrypting the audio later.

Combining the First, Compressed and Encrypted, Audio Signal with a Second Audio Signal In the example of FIG. 1, the first signal, which is the compressed and encrypted audio, is combined in a combiner 8 with a second audio signal from a source 6. The encryption of the first signal from source 1 creates a signal which appears to be noise to the human ear in the combined signal because of the randomising effect of the encryption. The second signal from source 6 is any audio signal. One example is an announcement. An example of an announcement lets a user know what the original audio from source 1 is and how they can obtain the key or keys for decrypting the original audio. In other examples, described in more detail below, the second signal is an impaired version of the original audio. In this example the second audio signal can be intelligibly reproduced at least without decryption and preferably without decompression even when combined with the first signal from source 1.

Figure 9:
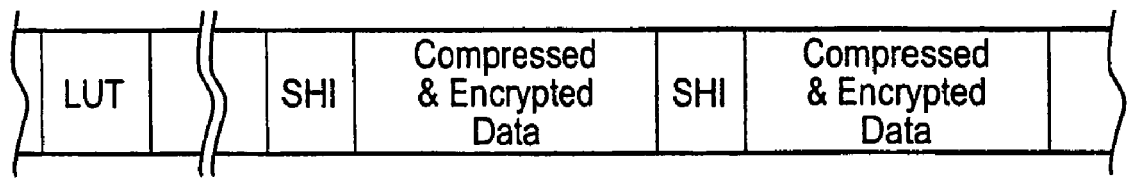
FIGS. 9 to 14 are illustrative data structures in accordance with the invention.

The combined signals, which in this example are a file, are then stored in a store 9, and/or provided to a transmission system 9, and/or recorded on a suitable recording medium 9 indicated as distribution material in FIG. 9. The transmission system may be a "pull" system for example the Internet or a "push" system for example any broadcast system including DAB (Digital Audio Broadcast) and DVB (Digital Video Broadcast).

The example of FIG. 1 has been described as if the compressor 2, encryptor 4, and combiner 8 are discrete hardware elements. Whilst they may be such, the system of FIG. 1 may be implemented in software for operation on a computer.

Figure 2:
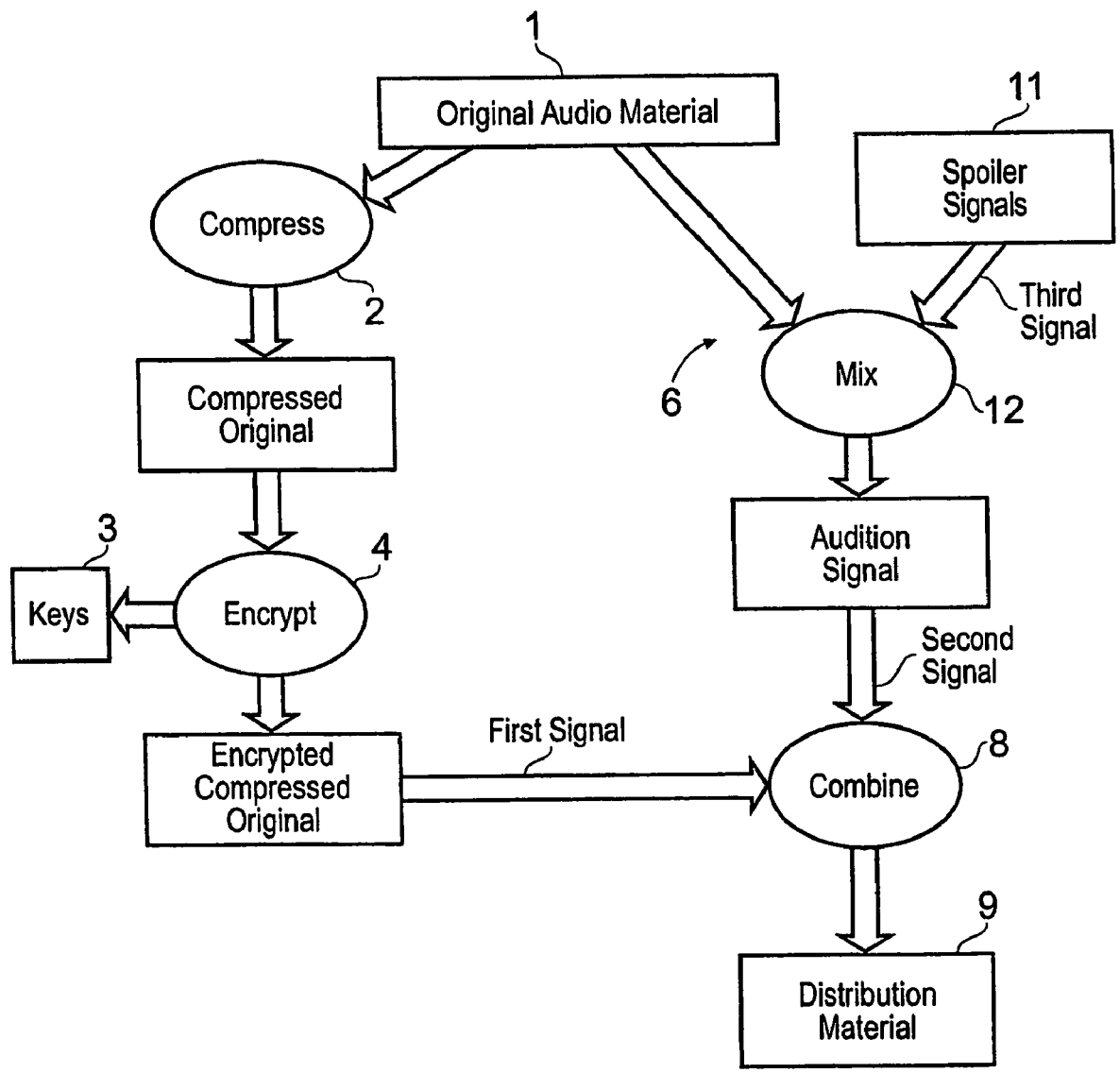
FIG. 2 is a schematic block diagram of a second illustrative system for processing audio signals in accordance with the present invention.

FIG. 2 differs from FIG. 1 by showing details of an example of the source 6 of the second signal. In this example the source 6 provides to the combiner 8 an impaired version of the original audio from source 1. The impaired audio in this example is reproducible without decryption and decompression when combined with the original audio, which appears as noise in the combined signal. This allows a user to hear an audition signal, which is an impaired version of the original audio, without allowing them access to the original unimpaired audio.

Mixing a Spoiler Signal with an Audio Signal

As shown in FIG. 2, the source 6 preferably comprises a mixer 12 which mixes original audio from source 1 with a spoiler signal from a source 11 to produce an audition signal. The mixer is an additive mixer and the output of the mixer is the audition signal. The relative amplitudes of the original audio and the spoiler in the audition signal are a matter of judgement. If the level of the spoiler is too small with respect to the original audio it may be encourage unauthorised attempts at removal. If its level is too high it will mask the original audio too much. The audition signal is combined with the compressed and encrypted original audio in the combiner 8 to produce the distribution material 9. The spoiler signal may be any signal. An example of a spoiler signal is an announcement as described above. The source 11 of spoiler signals may store a suite of different signals which may be chosen according to the audio to be spoilt.

Modulating the Spoiler Signal

Figure 3:
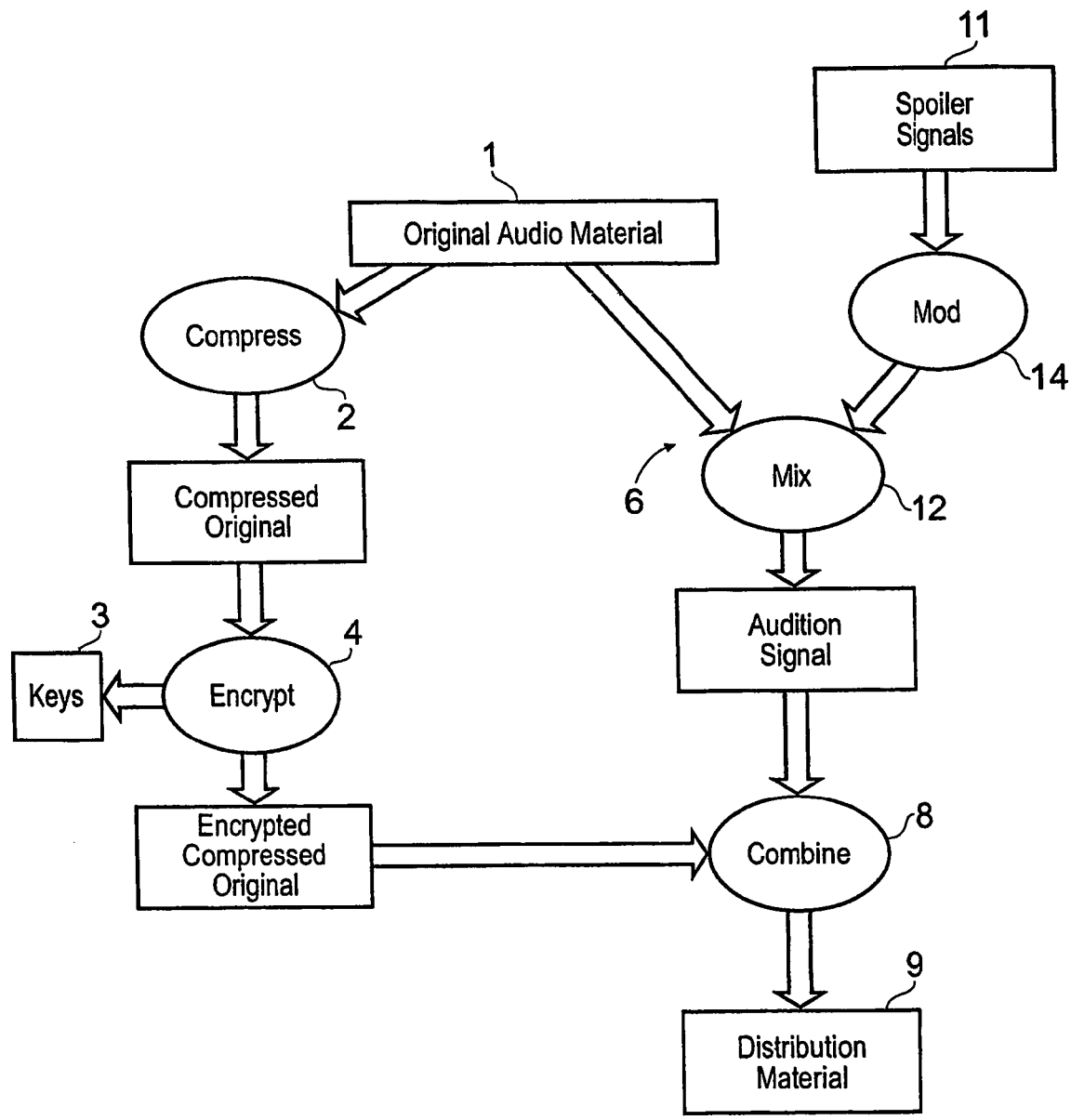
FIG. 3 is a schematic block diagram of a third illustrative system for processing audio signals in accordance with the present invention.

FIG. 3 shows a modification of the system of FIG. 2, in which a modulator 14 is provided. The modulator 14 modulates the spoiler signal to make it more difficult to remove. The modulation may be any suitable modulation including for example reverberation, phase modulation and pitch shifting.

FIGS. 1 to 3 show systems which allow the second signal from source 6, which may be an impaired version of the original signal, to be reproduced without the need for decompression and decryption. Thus in the case of the second signal being an impaired version of the original audio from source 1, the audition signal has the same format (albeit spoilt) as the original audio and can be reproduced using any player capable of reproducing the original audio from source 1.

Compressing the Audition Signal

Figure 4:
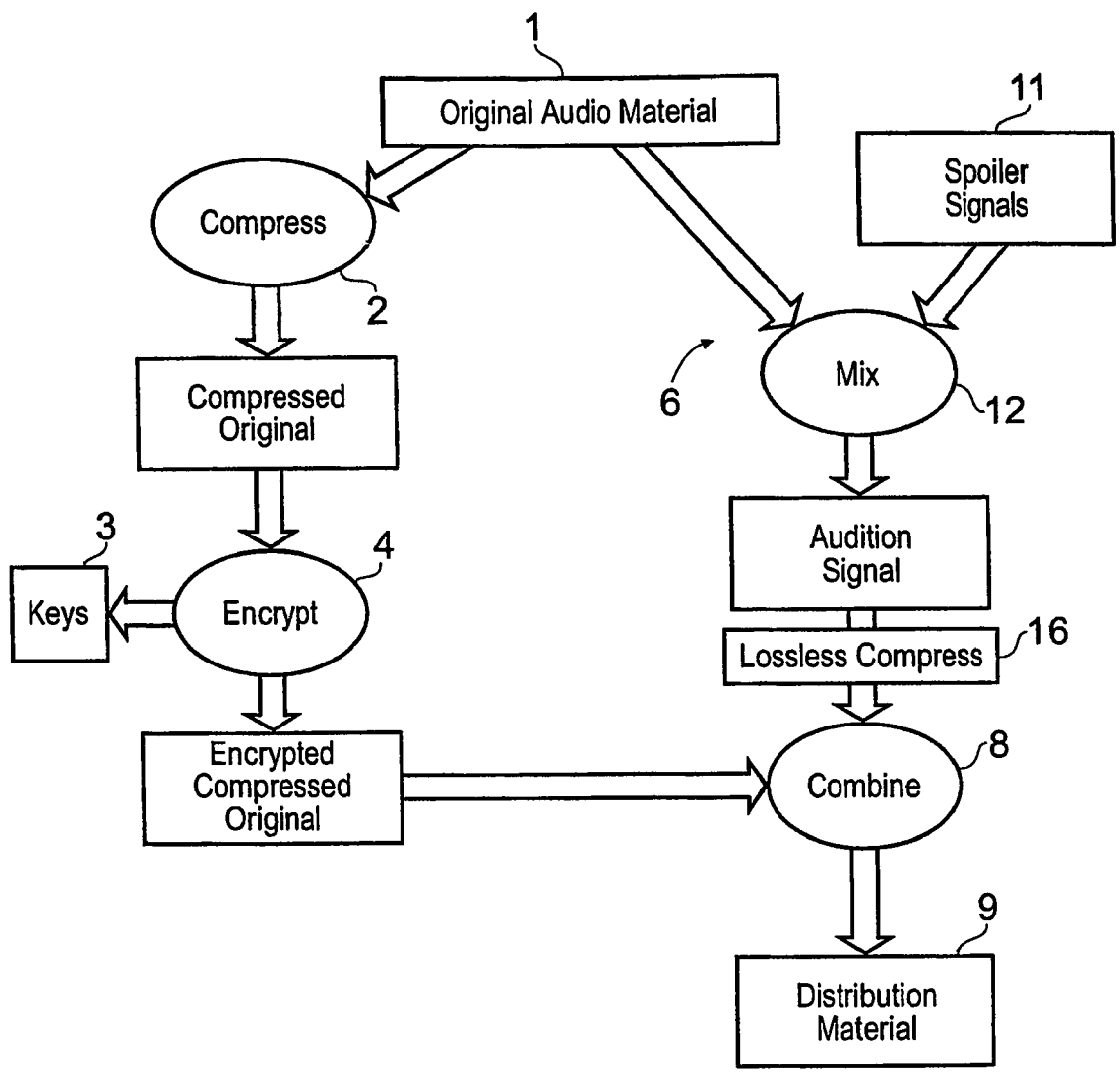
FIG. 4 is a schematic block diagram of a fourth illustrative system for processing audio signals in accordance with the present invention.
Figure 5:
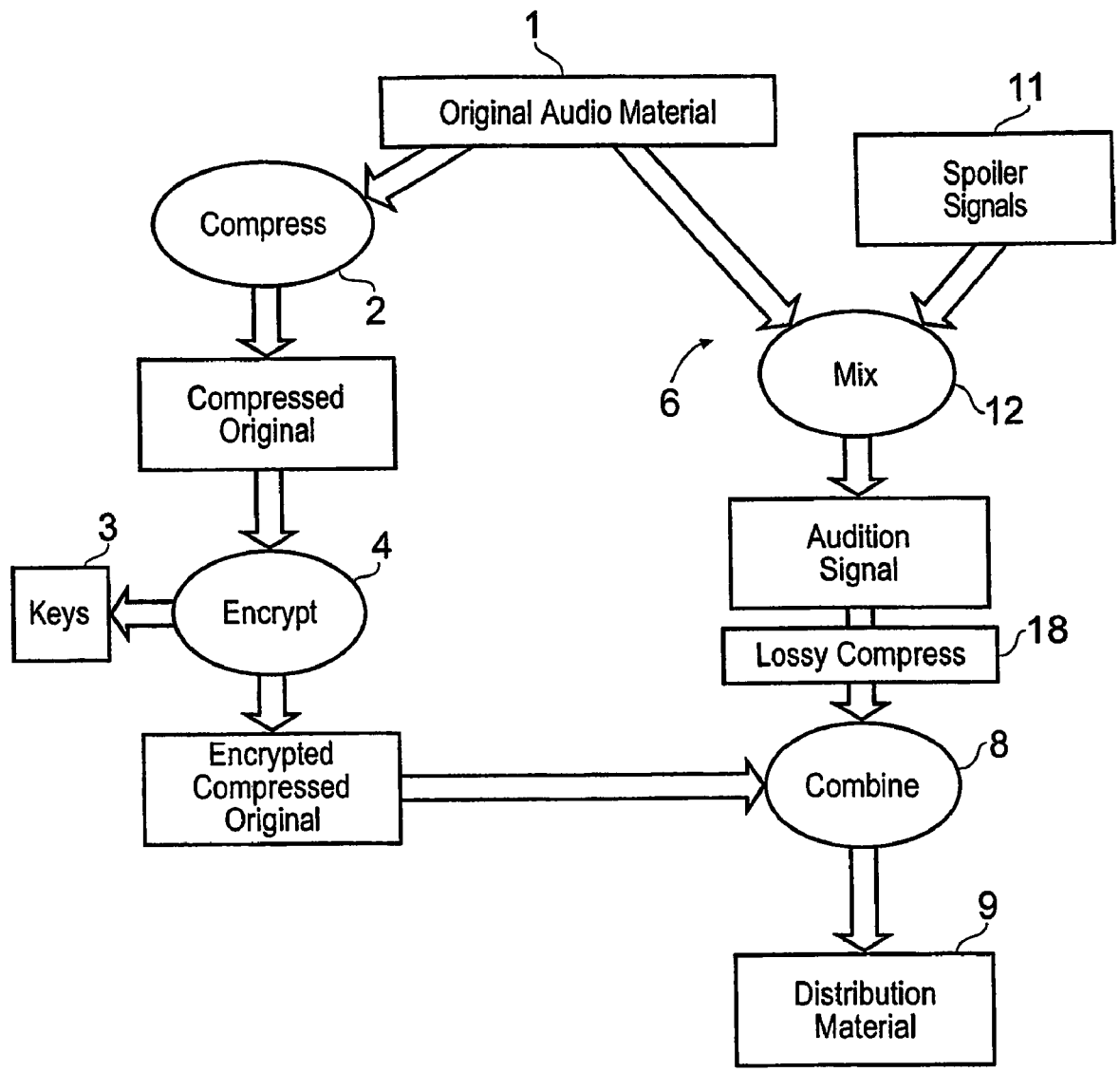
FIG. 5 is a schematic block diagram of a fifth illustrative system for processing audio signals in accordance with the present invention.
Figure 6:
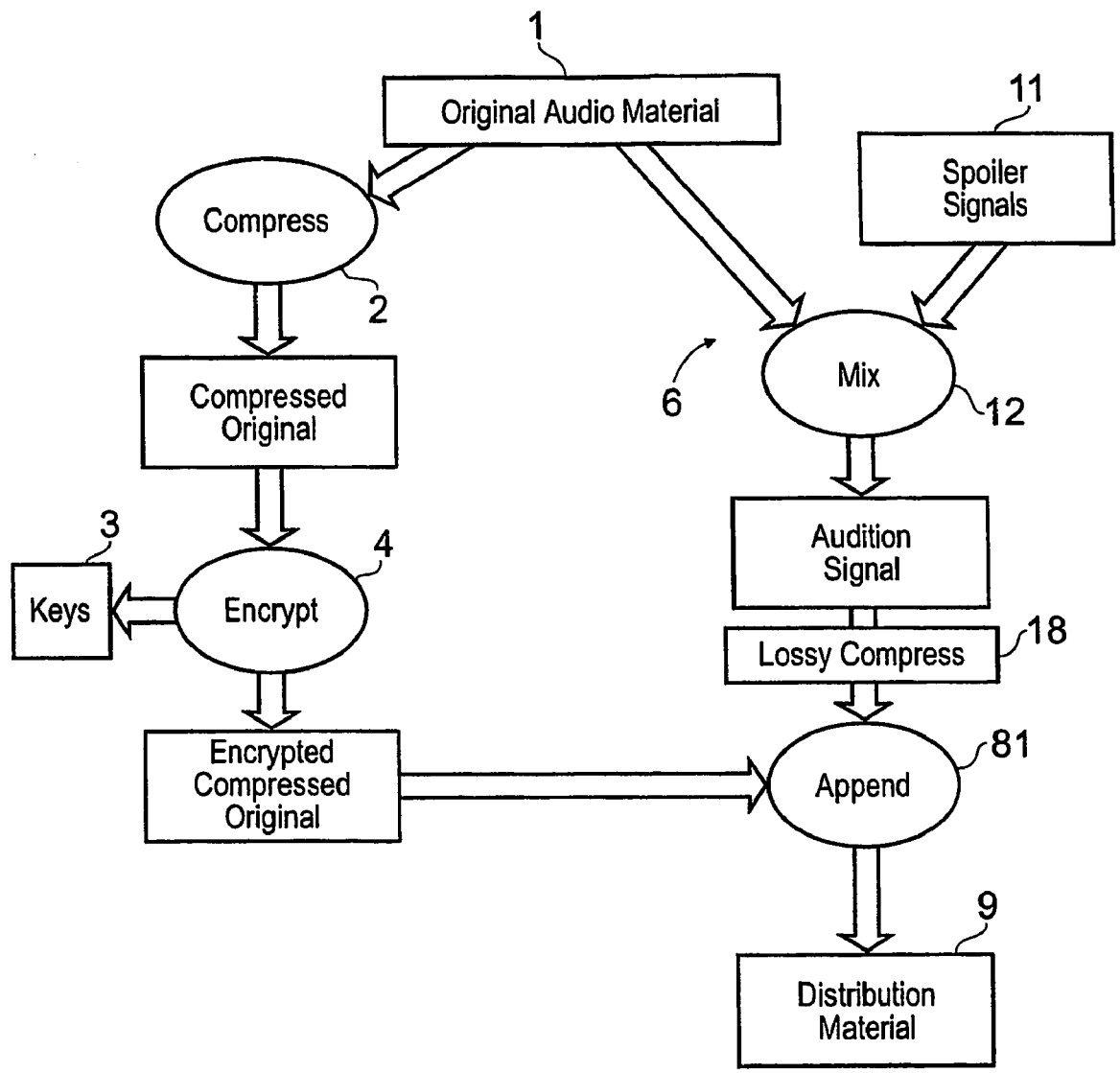
FIG. 6 is a schematic block diagram of a sixth illustrative system for processing audio signals in accordance with the present invention.

FIGS. 4, 5 and 6 show systems which are modifications of the system of FIG. 2. They differ from FIG. 2 by the addition of a compressor 16 in FIGS. 4 and 18 in FIGS. 5 and 6. The compressor 16 or 18 compresses the MSBs of the audition signal. The LSBs are removed before compression because they are replaced by the first, compressed and encrypted audio, signal as described below. The system of FIG. 3 including the modulator 14 may be modified in the way shown in FIGS. 4, 5 and 6. In FIG. 4, the compressor 16 operates according to a lossless compression algorithm and may be the same as compressor 2. In FIGS. 5 and 6, the compressor 18 operates according to a lossy compression algorithm examples of which are compression algorithms defined in the MPEG standards. In order to reproduce the audition signal, a reproducer needs a decompressor corresponding to the compressor 16 or 18.

Combining the Compressed and Encrypted Audio Signal with the Audition Signal

The combiner 8 of any one of FIGS. 1 to 5 may operate in the following way.

Figure 10:
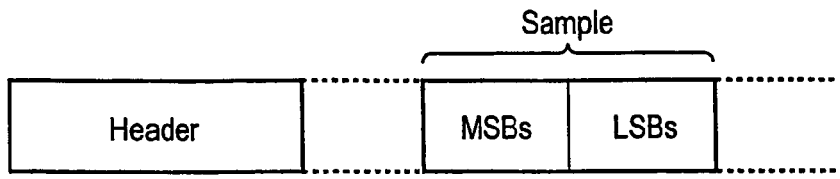
Figure 11:
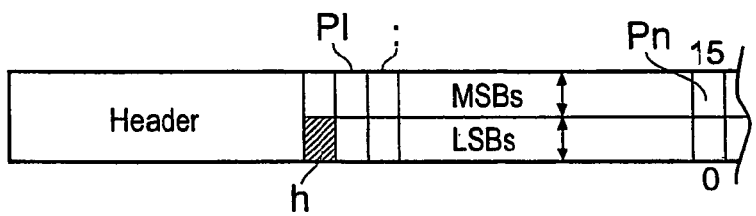

Assume the compressed and encrypted audio signal is in the form of a file and the audition signal is also in the form of a file. Assume also that both files have the same format although that is not essential. Referring to FIG. 10, each file contains sampled audio, having samples represented by digital numbers having Most Significant Bits (MSBs) and Less Significant Bits (LSBs). Each file has a Header which may for example identify at least the type of file (e.g. WAV) and the number of samples in the file. The number of bits per sample may be any number conventional in the art, for example 8, 16, 24 or 32. FIG. 11 described below assumes 16 bits per sample P1, P2 . . . Pn.

A) In one example, the LSBs of samples of the audition file are replaced by samples of the compressed and encrypted audio signal. Thus in the combined signal the MSBs represent the audition file and the LSBs are noise representing the original audio from source 1 and occur in the combined signal as noise.

If the audition file is sufficiently long, all the samples of the encrypted and compressed audio are placed in the LSBs of the audition file. If the encrypted and compressed audio file does not fill the LSBs of the audition file, then the unused LSBs of the audition file may be replaced by zeros or they may be retained unchanged. If the encrypted and compressed file is longer than can be accommodated by the LSBs of the audition file, then additional samples of the combined file are created comprising zero filled MSBs and LSBs which are the samples of the encrypted and compressed audio.

The ratio of MSBs to LSBs in each sample of the combined signal file may be fixed, or alternatively it may be variable. Referring to FIG. 11, at least when the ratio is variable and preferably also when the ratio is fixed, data h is provided in the combined file indicating the boundary between the MSBs and the LSBs. For a fixed ratio, the data h may be provided once in the file at the head of the file. It is added to the encrypted data represented by the LSBs as shown in FIG. 11. If the ratio is variable, the data h is provided at each position where the ratio changes.

The ratio of MSBs to LSBs may be chosen as a function of the lengths of the file of the audition signal and of the file of the compressed and encrypted audio signal.

Bit Distribution

Figure 18:
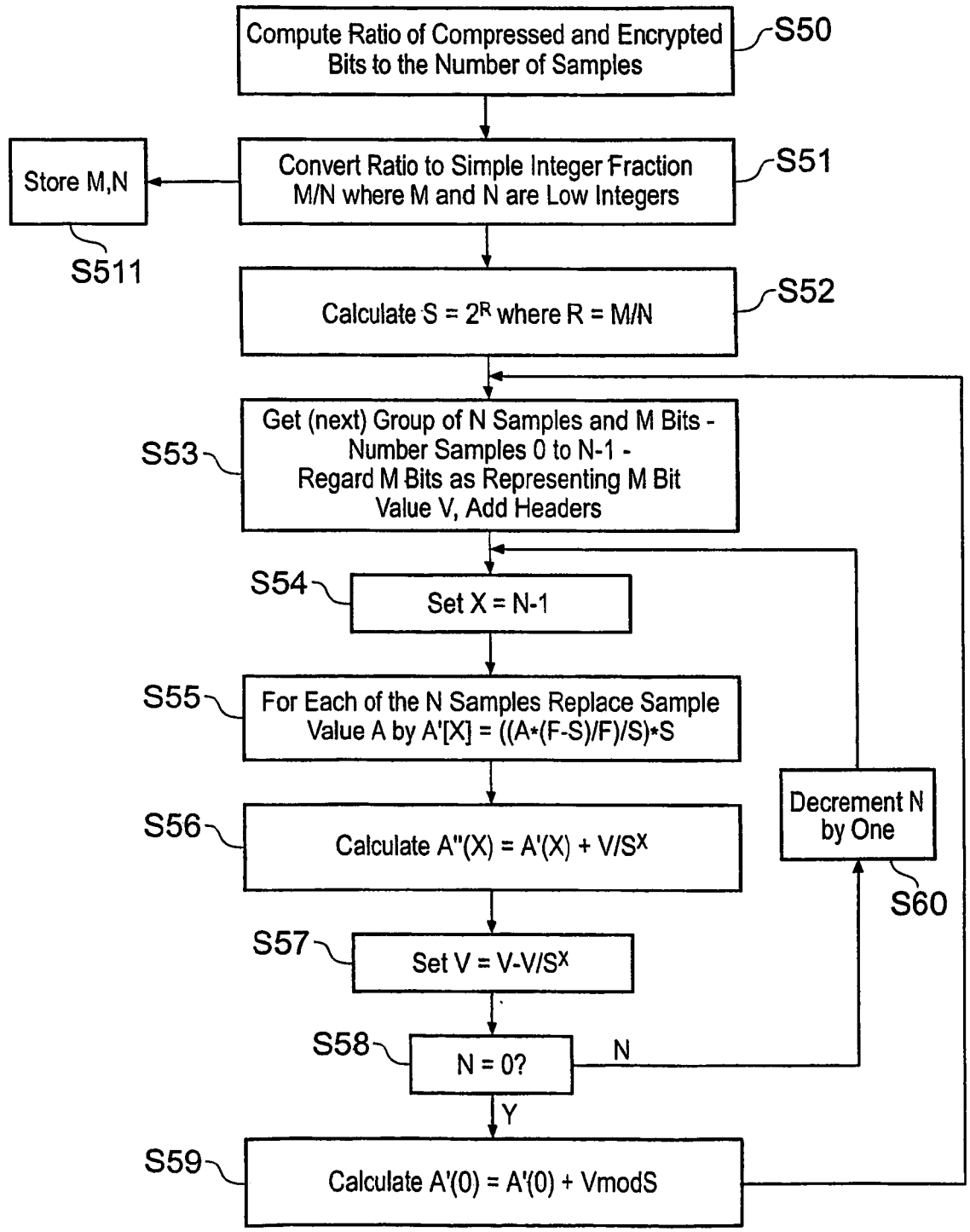
FIG. 18 is a flow chart illustrating a method of distributing bits of audio signal amongst samples of audio signal.

B) Referring to FIG. 18 another method (which is referred to herein as "Bit Distribution") of distributing the bits of the compressed and encrypted signal over samples of the audition signal is as follows.

This explanation assumes that a file of audio is processed as shown in FIG. 2. The original audio has n-bit samples which are compressed by compressor 2 and encrypted by encryptor 4 by an encryption algorithm which does not significantly change the number of compressed bits. By way of example assume 10 seconds of stereo audio sampled at 48 kHz with 16 bit samples and a compression ratio of 0.65. The number of audition samples is then 48000*2*10=960000. The number of compressed bits is 0.65*960000*16=9,984,000.

At step S50 the ratio of the number of compressed bits to the number of uncompressed audition samples is calculated. For this example the ratio is 10.4.

At step S51, that ratio is converted to a simple integer fraction M/N equal to or greater than the said ratio, where M and N are low integers. 10.4=52/5. Thus M=52 bits are to be distributed over each set of N=5 samples as the LSBs of those audition samples. (In practice it is desirable to choose a value of M which is less than the word length of the computer on which the method is implemented to keep the subsequent processing simple. M and N are stored (S511) to enable the subsequent reversal of the process.

At step S52 a value $S=2^R$ is calculated. R equals M/N.

At step S53, a group of N=5 samples and M=52 bits is obtained. Header data is added to the bitstream to indicate the group. For the purposes of the following explanation assume the M bits represent an M bit number of value V. The samples are ordinally numbered 0 to N−1, in this example 0, 1, 2, 3 and 4.

At step S54 set X=N−1.

At step S55, A'[X]=((A*(F−S)/F)/S)*S is calculated for each of the N samples, where A is the range of the audition sample. This scales the value of A and is termed a scaled value below.

By way of explanation Step S55 is a combination of two sub-steps which when combined produce step S55. In the first sub-step each audio sample is pre-scaled according to A'[X]= A[X]*((F−S)/F) so it fits in the range −(F+S) . . . (F−S). F is the maximum value which a sample can take. For a 16 bit sample $F=+/-2^{15-1}$. The second sub-step scales each pre-scaled audio sample A'[X] according to A"[X]=(A'[X]/S)*S so that it has a value in set{−(F+S), −2S, 1S, 0, 1S, 2S . . . F− S} . . .

At step S 56 replace the current scaled value A" by a new value $A'[X]+V/S^X$ where A'[X] is the ordinally numbered scaled value. This adds the bits representing $V/S^X$ to the scaled value A"[X].

At step S57, V is replaced by $V-V/S^X$.

At step S58, if N is not 0 then N is decremented by 1 and another set of bits of V are added to the next sample by steps S55 to 57. If N=0 then the $0^{th}$ sample is replaced by A'[0]+ VmodS which has the effect of adding the remaining value of V to the $0^{th}$ sample.

Figure 19:
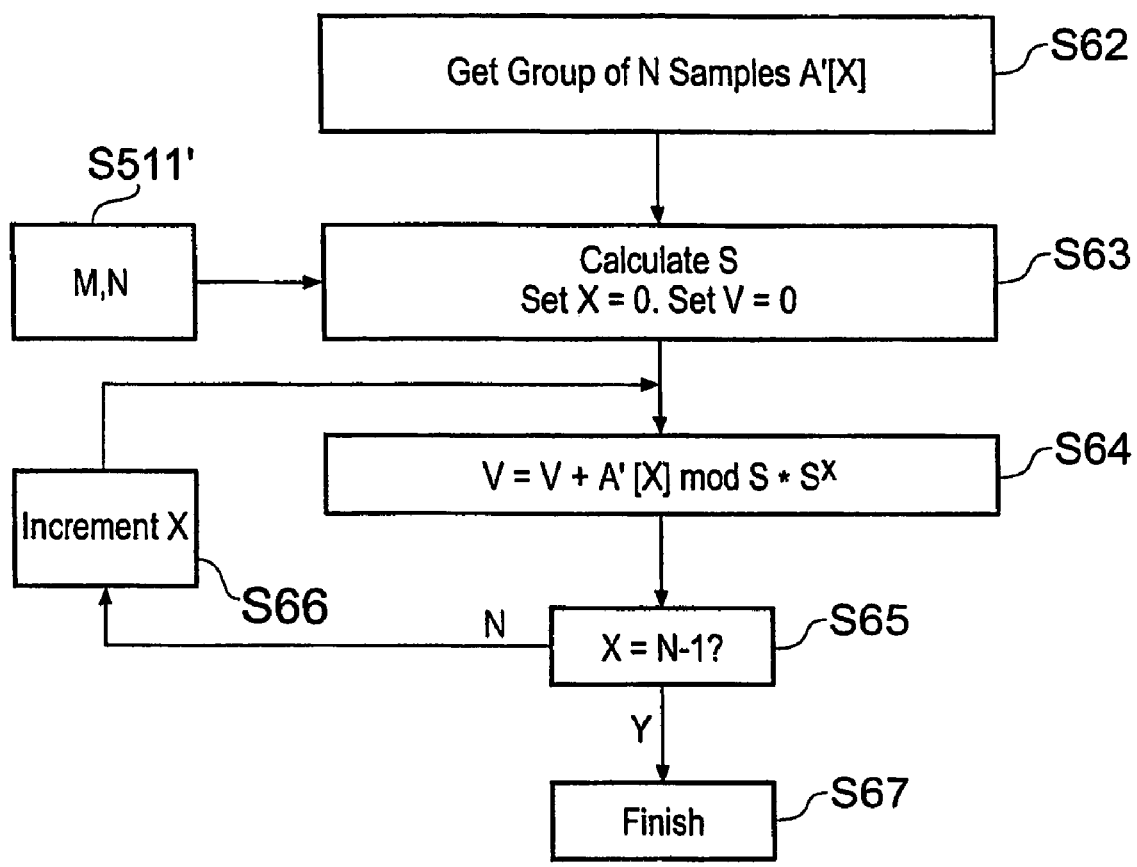
FIG. 19 is a flow chart of a method of reversing the process of FIG. 18.

Referring to FIG. 19, the method of extracting the M original bits from the combined bitstream is as follows.

Starting at step S62, the group of N samples A' are obtained and at step S63. X and V are set initially to 0. Then at step S64 the current value of V is replaced by a new value V+(A'[X] mod S)*$S^X$. Thus for the first calculation X=0 so V=A'[0]mod S.

If X is not N−1 at step S65, then X is incremented by one at step S66 and V replaced by the new value at step S 64. That cycle repeats until all N samples have been processed, the final value of V=V+A[4]modS*$S^4$ being the restored original bits.

Figure 13:
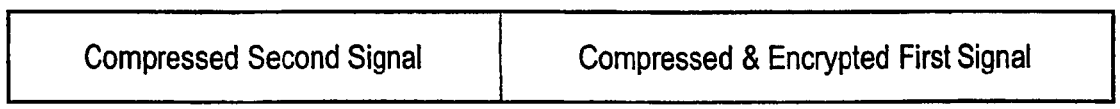

C) Referring to FIG. 6 the encrypted material file is appended to the audition file as is shown schematically in FIG. 13. Alternatively, encrypted material is inserted as a non-audio section in the combined file.

Reducing the Size of the Combined File.

It is possible that, for a given file-size of the combined file, when using the combining method A described above, the number of MSBs representing the audition signal in the combined signal may be too small to provide an adequate audition signal for a user to hear but it is not desired to increase the size of the file. It is possible to make more space available for the MSBs representing the audition signal, if the audition file is a multi-channel file, by converting the file to a single channel (mono) file. The compressed and encrypted audio may be placed in the LSBs of the audition signal by any of the methods described above. Any encrypted audio which cannot be fitted into the LSBs of the audition file may be appended to the audition signal (see FIG. 13), or inserted into the combined file as a non-audio section.

In one method, if the file has two channels, (i.e. it is a stereo file), each of 16 bits and 7 bits are needed for the audition signal, then the two channels may be converted to one mono channel of 32 bits. That increases the bits available for the compressed and encrypted signal from 2*(16-7) [i.e. 18] to 1*(32-7)=25.

In another method, provided the number of bits per sample is greater than the number of channels the format of the original signal can be maintained and each channel of the signal is replaced by a mono fold-down of all the channels. As the mono signals are coherent, this has the effect of making the audition content of the distribution file perceptibly louder (for each added channel). The noise is incoherent, so remains at an unchanged perceived level. Consequently, an extra MSB in the audition file may be made available to the encrypted material (for each of the original channels) without loss of perceived quality except for loss of the multi-channel audio image.

A further method produces a single mono representation of the original signal, reduced to the size of one of the original channels. This greatly reduces the file size, allowing any excess encrypted data (after the merge operation) to be appended to this file (or inserted as a non-audio section).

A method for reducing the file-size of the combined file, which may be acceptable in some circumstances, is to reduce the sample-rate of the samples in the audition file, using standard down-conversion algorithms. This has the effect of reducing the frequency range of the audition signal and also effectively decreasing the file-size of the audition signal relative to the original. Encrypted audio is placed in the LSBs of the samples as described above. Any encrypted audio which cannot be fitted into the LSBs of the audition file may be appended to the audition signal (see FIG. 13), or inserted into the combined file as a non-audio section.

Figure 7:
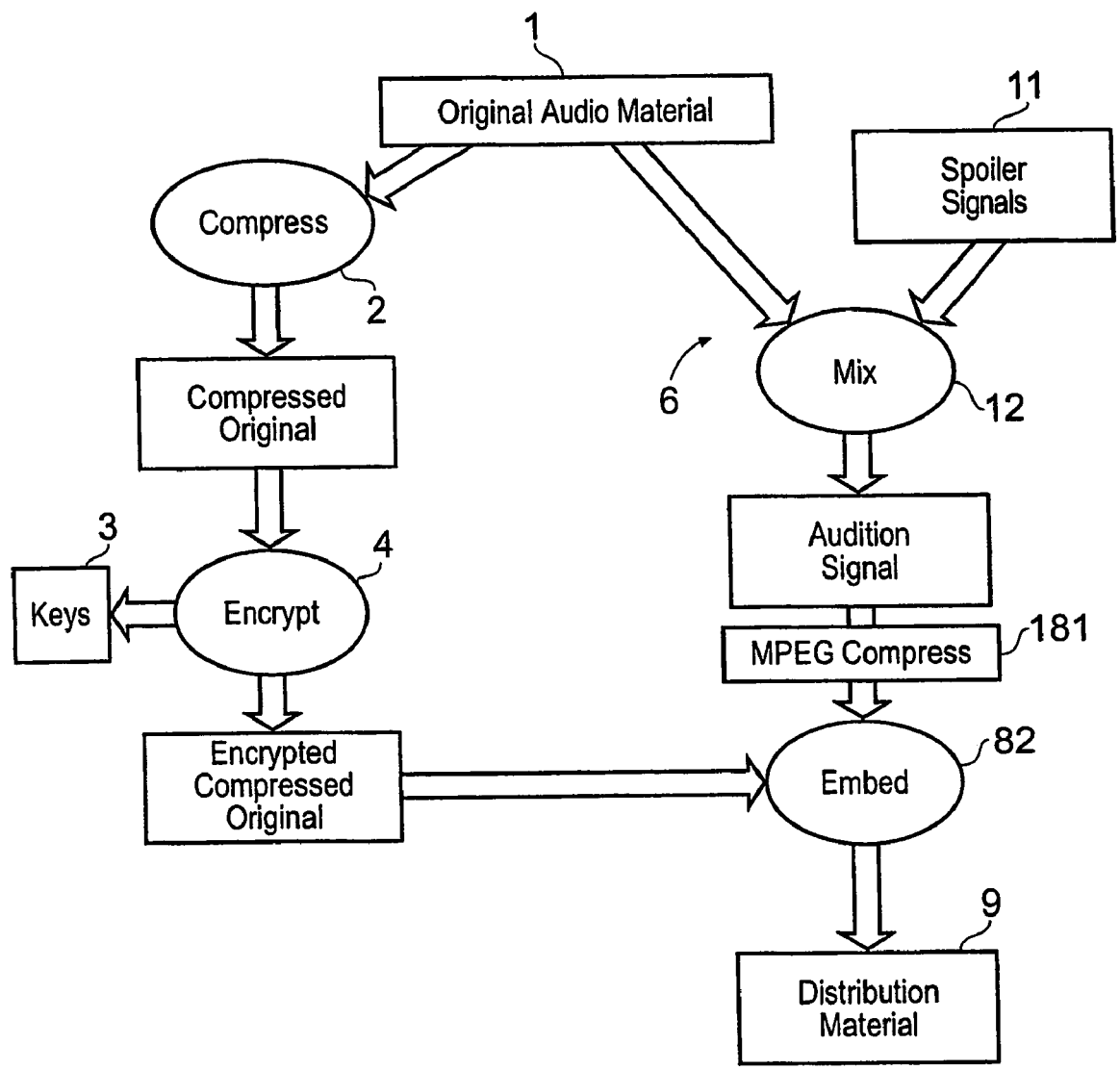
FIG. 7 is a schematic block diagram of a seventh illustrative system for processing audio signals in accordance with the present invention.

Converting a multi-channel file to a single channel file as described in this section may also be used in conjunction with the combining method B (Bit Distribution) described above, MPEG Compression Referring to FIG. 7, the compressor of the audition signal may be an MPEG compressor. An MPEG data structure has data space which may be used for auxiliary data and data space for the compressed audio as is shown in simplified and schematic form in FIG. 14. In this example, the compressed and encrypted audio signal is placed in the auxiliary data space of the MPEG data structure.

Thus the audition signal can be reproduced using an MPEG reproducer.

Compression formats other than MPEG may provide equivalent auxiliary data space. MP3 may be used for example with auxiliary data space therein.

In addition to, or as an alternative to using the auxiliary data space, the compressed and encrypted audio may be appended to the end of the MPEG data structure as shown in FIG. 13.

Techniques Using Blocks, Segments or Sections of Audio. Partial Encryption and Decryption.

In some situations it may be desirable to allow only subsections of the original material to be extracted from the distribution material. In this case, as the original file is being compressed in compressor 2, it is split into segments of a fixed length (e.g. 1 sec, 5 sec, 10 sec), or into sections at specified points. In the example of an audio track of a film or video, the sections may correspond to scenes. In this example, different encryption keys are used to encrypt the different segments or sections, and saved in a lookup file for later decryption. In this example, the compressed/encrypted file must contain information at determinable points (normally section or segment boundaries), which indicate which section or segment of the original audio is contained within that section or segment. This information is necessary, as the compression obtained is not constant throughout the compression process, so there is not a fixed method for calculating position in the original material from position in the encrypted/compressed version. The compression/encryption in this mode can be done in one of several different ways, two of which are mentioned here:

1. The whole file is compressed in a single pass. This generally produces the most efficient compression ratios, but requires that section or segment headers are placed in the compressed file during the compression process. The headers BH are placed at block boundaries to indicate what part of the original audio is contained in the following section or segment; see FIG. 12.

Sections or segments of desired length are then separately encrypted and merged with the audition signal using a method as described above.

The sections or segments of the encrypted data may be organised as follows:

a) Referring to FIG. 9, the sections or segments are based on the header data BH inserted during compression. Section or segment headers SH1, indicating the encrypted sections or segments, are provided in the encrypted data. The headers include location start data plus block length data, block ID data and possibly other data. The location start data is extracted from the compressed data headers BH during the encryption process. This allows a section or segment to be located without needing to decrypt the data.

b) Alternatively, section or segment header data is not included in the encrypted data, in which case it is then necessary to rely on the headers of the compressed data to locate a section or segment. That requires decrypting at least some of the segments to locate the headers in the compressed data.

2. The original file is split into the desired segments or sections, each of which is compressed and encrypted separately. The resulting compressed and encrypted sections or segments are then concatenated as shown in FIG. 9. In this case, the segment location information SH only needs to be embedded in the encrypted file although it is not encrypted itself. The compressed and encrypted file including the headers SH is then combined with the audition signal (as in the methods described above)

A modification which is applicable to both of the above segmented encryption methods is to place a complete lookup table LUT of segment/offset information at a known place in the encrypted or compressed file, which enables the correct segment or section to be located quickly.

In this variant, decryption and extraction is similar to that described in the method described above. When a valid request is received to extract a segment or section of the distributed file, the key(s) for the segment or section is/(are) retrieved from the lookup file, the segment or section is located in the encrypted data (LSBs) of the distributed file, using the information saved in the block header(s), and the sections or segments decoded.

If a user requests the extraction of a portion of the audio which is longer than one segment or section but does not coincide with section or segment boundaries, then whole sections or segments which include the requested portion are extracted to allow correct decryption and decompression. However, more data is extracted than is requested. Thus blocks which contain audio samples outside the requested segment are extracted. These are discarded after decryption and decompression. When choosing a basis for the original file segmentation, care should be taken to ensure that the decodable segments sizes and the permitted extraction request sizes do not allow large numbers of samples to be decoded outside requested portions of audio, as they are potentially available for unauthorised use. This potential security gap is completely avoidable if permitted segment extraction exactly follows encoding lengths (eg on 10 second boundaries), or the original material is explicitly encoded in segments and extraction requests are restricted to those segments.

Adaptive Bit-Slicing.

Louder audio signals mask noise better than quiet ones. In this, adaptive bit-splicing, variant the signal level of the spoilt material is analysed before or during the combining stage and is divided into blocks with different average loudness. The blocks may be either of fixed length, or of variable length determined by loudness thresholds. The sequence of blocks thus generated may then be combined with the encrypted data, using a bit-slice (MSB:LSB ratio) based on the loudness of each block. In this method, the compression and encryption of the first signal may be performed on the whole of the original material, but the encrypted data is also broken into blocks at the same block-boundaries as the audition material with header information at the start of each encrypted block giving the number of samples at a given bit-slice, which is required when the encrypted data is subsequently extracted when the original is restored.

This variant may be combined with the with the partial-decryption variant (above), by setting a maximum segment size for audio of similar loudness which allows decryption of the original on the required boundaries.

Streaming Audio.

In some situations, it may be required that the operation of creating the distribution file should start generating output before the whole original audio has been read. This might be the case if the original audio is received from a network connection rather than a file, or the output is being encrypted on-the-fly for distribution on a network connection. It is of course not possible to see the whole file before compressing or encrypting must start. The procedure to follow is similar to that for Partial Encryption-method 2 described above. The main differences are that: the same encryption key may be used for all blocks; a predetermined block length is used; and that it is not always possible to generate a continuous bit-stream for the encoded version of the data, as compression ratios obtained will vary from block to block. There is a choice of strategies, influenced by the actual compression ratio obtained for each block of original audio data, and the fact that the generated data must not stall waiting for subsequent blocks.

a If the MSB:LSB split is fixed, and the compression achieved does not permit the encrypted version to fit in the LSB stream (even using all the techniques described above), then the extra bits of the encrypted data remaining after the block of distribution data has been packed, then the extra bits must be placed at the head of the encrypted data of the next block b If the MSB:LSB split is fixed, and the compression achieved means that the encrypted version is smaller than the space available in the LSBs of the distribution material, then the remaining LSBs are filled with random noise.

c If the MSB:LSB split is variable, and the compression achieved does not permit the encrypted version to fit in the LSB stream, then either the MSB:LSB split is changed so that the all the bits of the encrypted data can be accommodated, or (if a practical limit to the split is reached), the extra bits of the encrypted data are moved to the head of the next block.

d If the MSB:LSB split is variable, and the compression achieved means that the encrypted version is smaller than the space available in the LSBs of the distribution material, then the remaining bits can be filled with random noise, or the MSB:LSB split can be raised to allow more MSBs from the audition tone to be heard.

Note that in cases c and d, it is possible that the SNR of the distributed signal will vary from block to block if the MSB:LSB split is changed. This is probably acceptable where the reason for the good/poor compression was because the original signal is quiet/loud in those blocks (louder noise is better masked by louder signals), and is the preferred method, as adjacent blocks generally obtain similar compression ratios.

The method described in the section Bit Distribution may also be applied to streaming audio.

Floating Point Format

The preceding description assumes that the digital audio is represented in a fixed point format. However the digital audio may be represented in floating point format. Those skilled in the art will recognise that floating point format might result in more complex processing.

Figure 8:
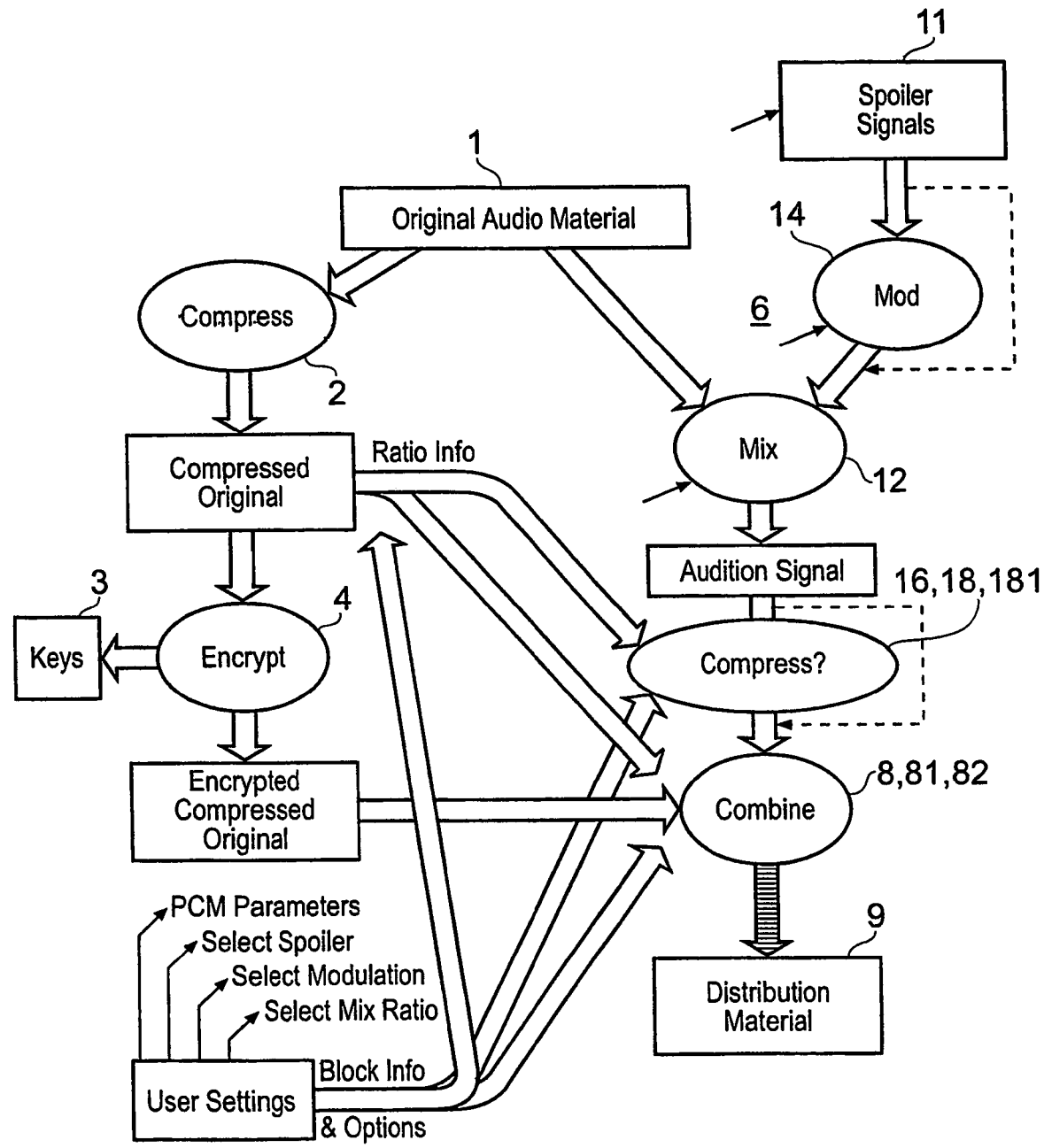
FIG. 8 is a schematic block diagram of an eighth illustrative system for processing audio signals in accordance with the present invention.

A Combined System (FIG. 8)

The invention has been described with reference to FIGS. 1 to 7 which individually show respective different methods of processing an audio signal. The various methods described above may all be implemented by apparatus as shown in FIG. 8. FIG. 8 will now be described, but the descriptions of the various methods described above which may be implemented by the apparatus will not be repeated here.

FIG. 8 differs from the apparatus of FIG. 1 to 7 as follows:

The compression ratio achieved by the compressor 2 may be measured and if the compressor 16, 18, 181 of the audition signal is provided, then the compression ratio of that compressor 16, 18, 181 may be controlled in dependence on the measured compression ratio. That enables the compression of the audition signal to be adjusted to provide an appropriate ratio of compressed MSBs representing the audition signal to LSBs representing the compressed and encrypted original audio for a given file size. Alternatively or additionally, the manner in which the audition signal is combined with the compressed and encrypted original audio signal may be chosen in dependence on the measured compression ratio, which also enables an appropriate ratio of MSBs (representing the audition signal) to LSBs (representing the compressed and encrypted original audio) for a given file size to be selected.

FIG. 8 also comprises a control panel 20 which may be a virtual control panel provided as a graphical user interface of a computer which enables a user to set various operating parameters of the apparatus. The control panel may set one or more of the following:

a) The choice of spoiler signal if a suite of spoiler signals is provided.

b) The relative signal levels of the spoiler signal and the signal being spoiled.

c) The choice of modulation if a suite of modulations is provided as described above.

d) Type of compression provided by the compressor 16, 18, 181 of the audition signal. Various types of compression are described above.

e) Type of combination of the audition signal and of the compressed and encrypted original audio signal. Various types are described above.

f) The type of block or segment or section of audio. Blocks may be of fixed length or variable. Segments or sections may be fixed or variable. They may be chosen to correspond to scene changes for example as described above. The control panel may be used to designate the scene change locations.

g) The control panel may be used to add information about the sections or segments.

h) Parameters for raw (headerless) PCM files such as sample rate, sample format etc.

The system of FIG. 8 may be controlled by an operator to select, and operate in, one of the manners described above or may be so controlled by a computer program.

Reproducer

Figure 15:
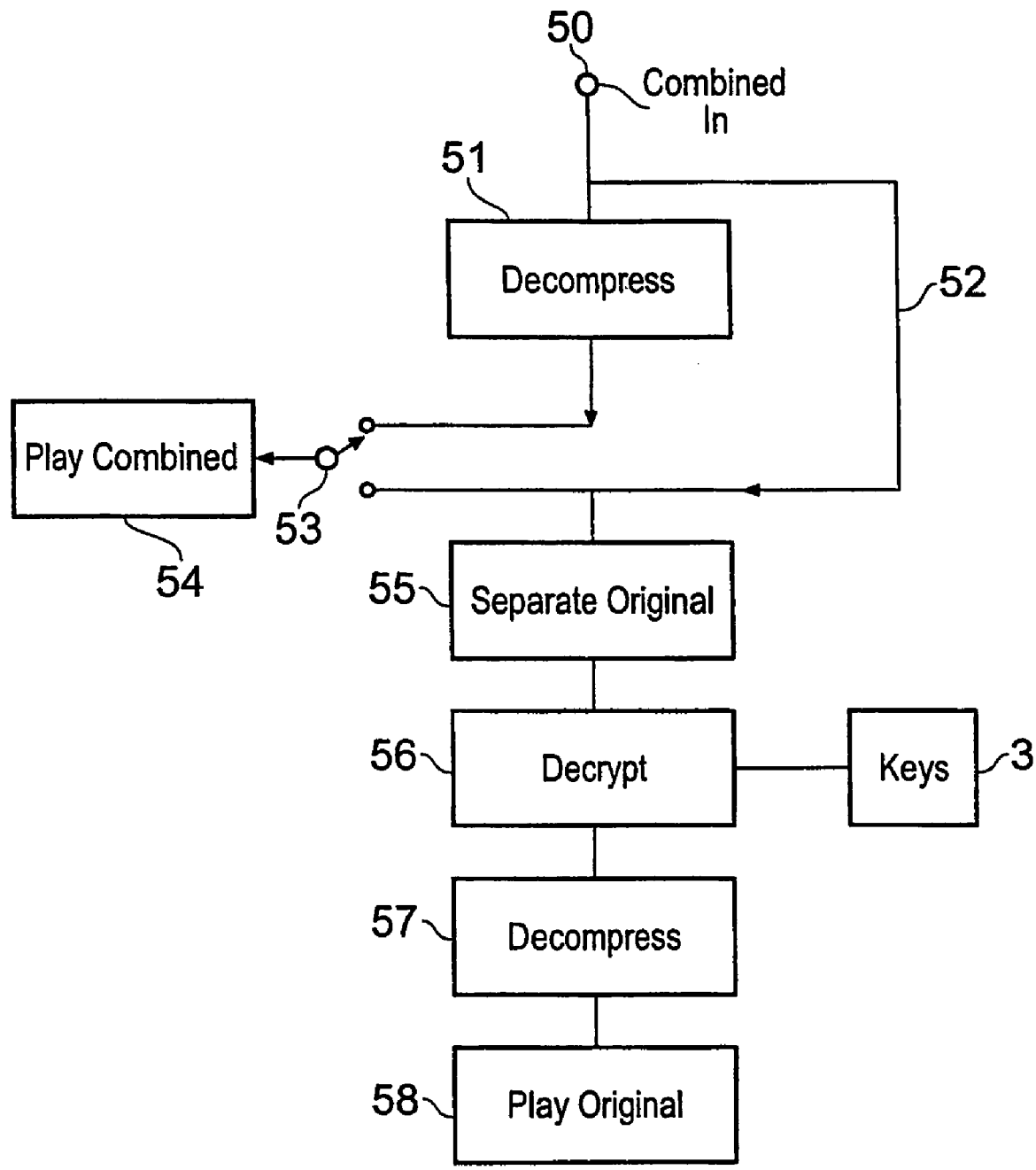
FIG. 15 is an illustrative block diagram of an audio signal player in accordance with the present invention.

Referring to FIG. 15, there is shown schematically an example of a reproducer (also referred to as a player). The combined file or bitstream is received at an input 50 and fed via a decompressor 51 (corresponding to compressor 16, 18 or 181 described above) or directly to a reproduction stage 54 which is operable to reproduce the uncompressed audition signal. A switch 53 selects the direct connection to the input 50 or the decompressor 51 dependent on whether the audition signal is compressed or not.

If the reproducer is intended to also reproduce the compressed and encrypted audio, it further comprises a separator 55 which separates the encrypted and compressed audio from the audition signal, a decryptor 56 which decrypts the separated signal using the keys 3, a decompressor 57 and a reproducing stage 58 which reproduces the original audio.

Figure 12:
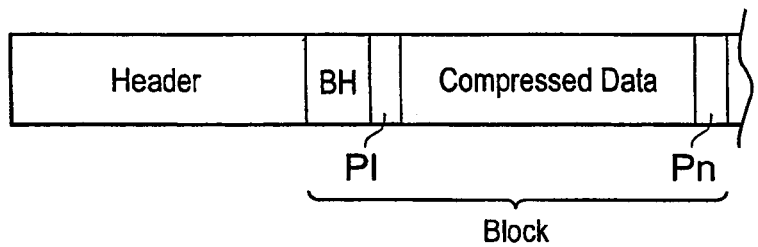
Figure 16:
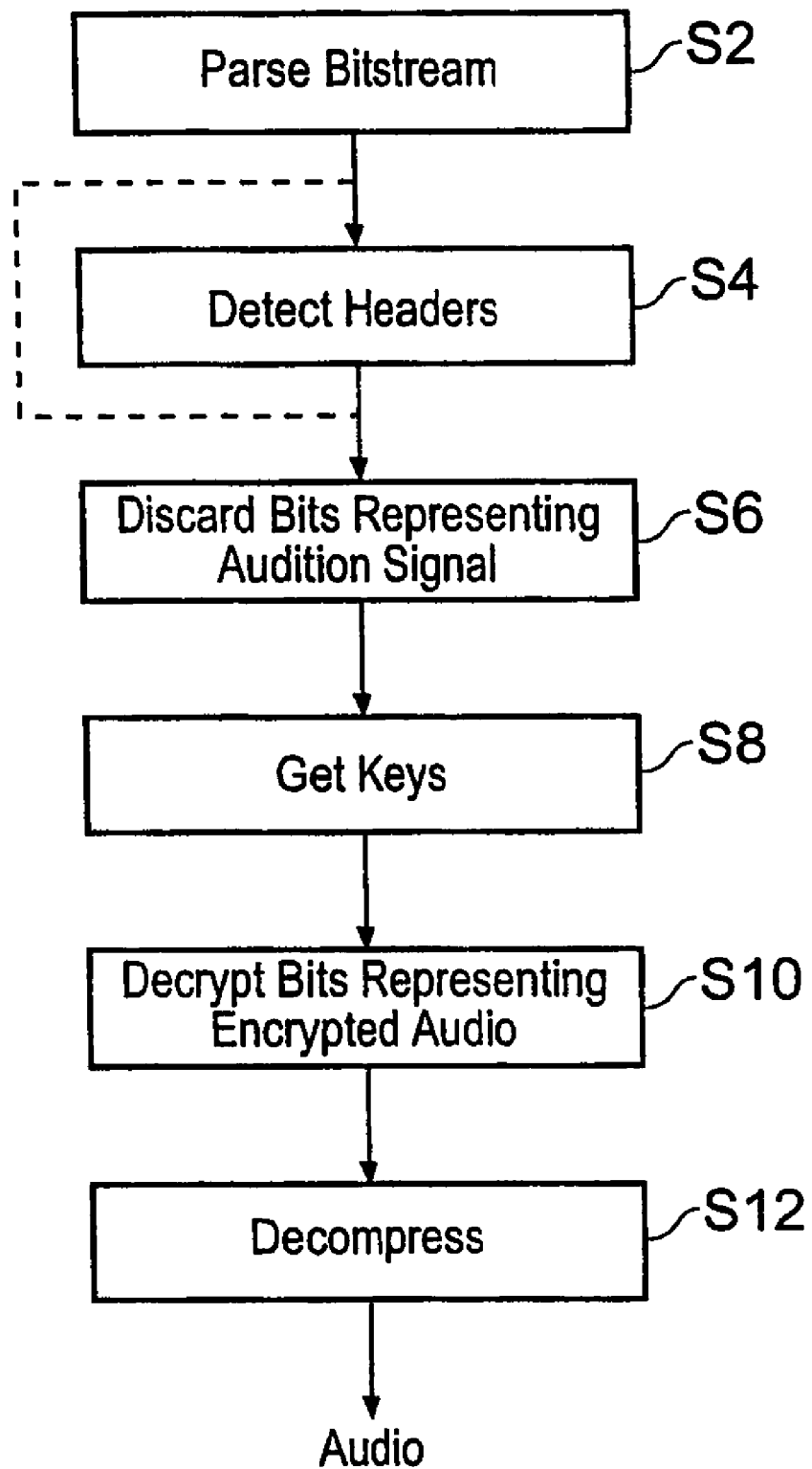
FIG. 16 is a flow chart illustrating the operation of the player of FIG. 15.

Referring to FIG. 16, for a data structure as shown in for example FIG. 11 or 12, the separator 55 parses S2 the bitstream and detects S4 the headers to determine where the boundary between LSBs and MSBs lies. The MSBs representing the audition signal are then discarded S6 leaving the encrypted and compressed audio represented by the LSBs.

If the first and second signals are combined by the method described in the section "Bit Distribution" described above then they are separated using the method described with reference to FIG. 19.

The decryption key or keys are then obtained S8 and used to decrypt S10 the LSBs. The decrypted audio is then decompressed S12.

Figure 14:
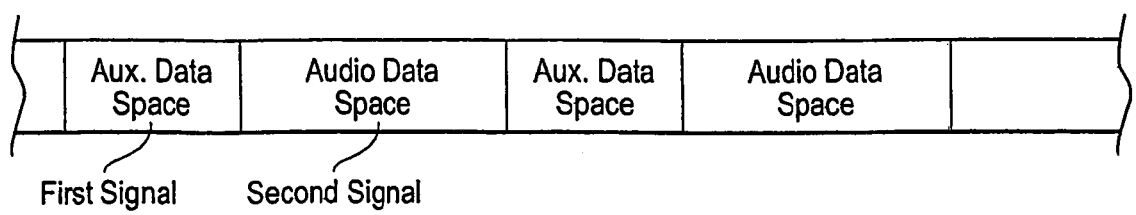

For other data structures such as those shown in FIGS. 13 and 14, the combined data structure is parsed S2 to determine the location(s) of the encrypted and compressed audio and the audition signal discarded S6.

Transaction Systems

Figure 17:
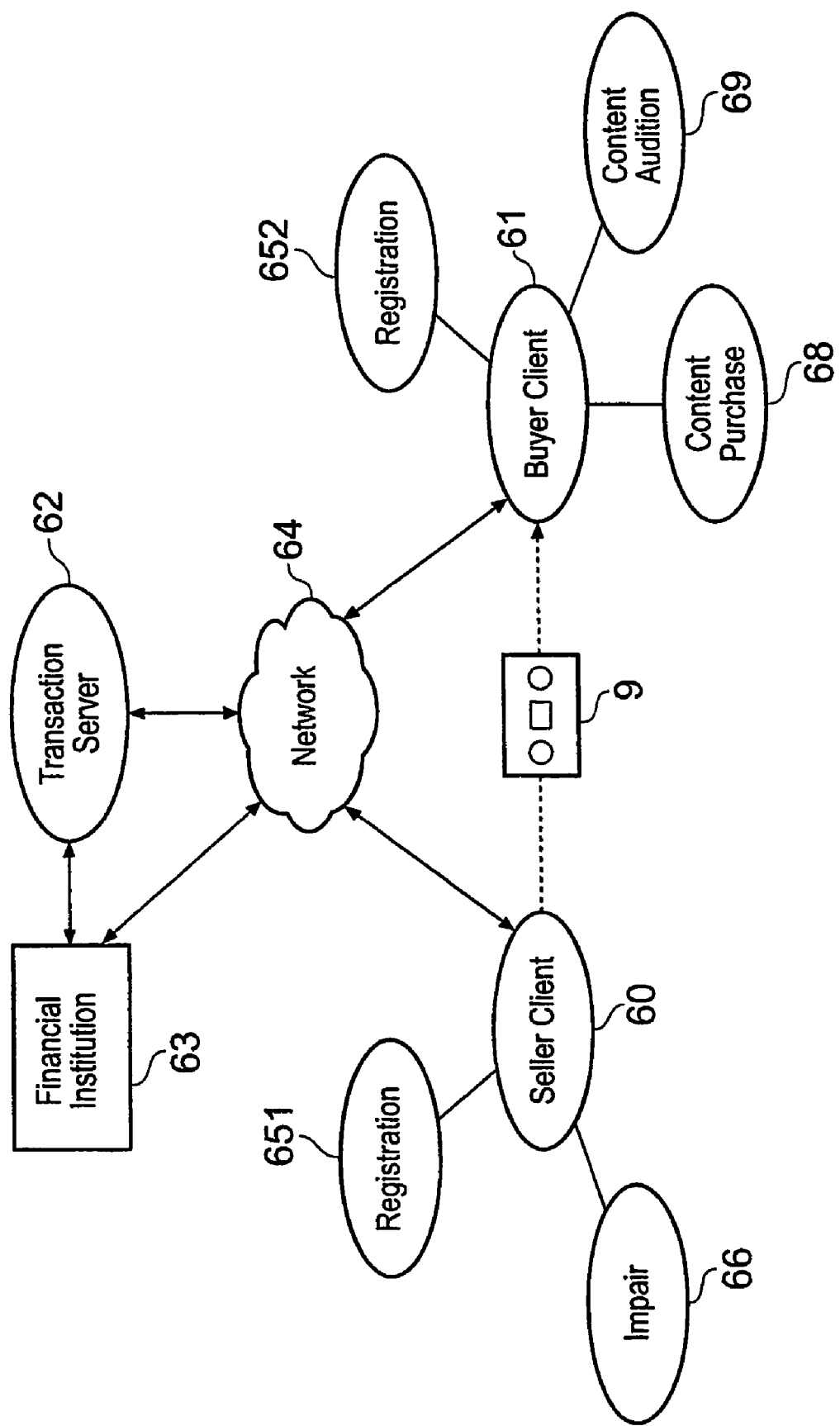
FIG. 17 is a schematic diagram of a networked system in which the present invention may be used.

Referring to FIG. 17, the present invention may be implemented as part of a system by which audio or any other data is traded. In FIG. 17 the terms "seller" and "buyer" are used for ease of description. Whilst those terms may indicate their ordinary meanings implying that a vendor sells the audio to a buyer outright in return for payment, they are also used here more generally to indicate that audio may be made available by a person or organisation (the seller), who may be acting on behalf of the originator and/or owner of the audio, to another person or organisation (the buyer) who may pay for the use of the audio under predetermined business conditions but transfer of the ownership of the audio does not necessarily occur.

Referring to FIG. 17, a first example of a system in accordance with the invention comprises a transaction server 62, a seller client 60, a buyer client 61 and a communications network 64 linking the clients to the server.

The owner of material, i.e. the seller, controls the seller client 60. A buyer controls the buyer client 61. In this example, a third party owns and controls the transaction processor 62 although the transaction processor may be owned and controlled by for example the seller. The system allows audio material to be acquired, securely and perceptibly spoiled or impaired as described herein above, and transferred to the buyer for the buyer to audition (69) the impaired audio material. If the buyer then wants to buy the original unimpaired audio material, the buyer obtains from the transaction server 62 the data needed to access the unimpaired audio. In this example, the seller and buyer both register (651, 652) with the transaction server. The data for accessing the unimpaired audio is sent from the transaction server to the buyer only when the buyer has paid for the material. The payment is monitored by the transaction server 62 which communicates with a financial institution 63. Payment is made via the server 62 and/or via the institution 63.

Associated with the seller client 60 is a first apparatus 66 for impairing the audio material as described above. The apparatus 66 may be as shown in any of FIG. 1 to 9 and 18 and 19. The key(s) needed for decryption of the encrypted audio are transmitted from the apparatus 66 to be stored in the transaction server 64 together with an identifier which identifies the material. Associated with the buyer client 61 is a second apparatus 68 for accessing the unimpaired audio. Such an apparatus may be as shown in FIGS. 15 and 16.

A content auditioning apparatus 69 is also denoted in FIG. 17 in association with the buyer client 61 for the purpose of hearing the audition signal. Such an apparatus may comprise elements 50, 51, 52, 53 and 54 in FIG. 15 which enable the buyer to reproduce the audition signal.

The seller client and the buyer client may be computers which implement the impairment of audio and access to the audition signal and the unimpaired audio. As part of the registration process, software for implementing the impairment of original audio may be provided by the server to the seller client. Likewise software for accessing the unimpaired audio may be provided by the server top the buyer client.

In this example the material is audio material and is recorded on a recording medium 9, e.g. a tape, disc or other store or is a bitstream form an external source. The material is acquired and processed by the first apparatus 66. In addition the material identifier is applied to the material. Then the material including the identifier is transferred on the medium 9 to the second apparatus 68, 69. The transfer is for example by post. Alternatively, the audio material may be transferred via the network 64.

The identifier is applied to the audio material during acquisition or during processing of the material to enable the key(s) to be associated with the audio and to enable the buyer, seller and transaction server to manage the selling and buying of the audio material. An example of an identifier is a Unique Material Identifier or UMID. UMIDs are described in more detail in SMPTE Journal March 2000.

To obtain the unimpaired audio, the buyer pays for the audio and obtains the decryption key(s) from the server 64.

A system as shown in FIG. 17 is described in more detail in European Patent Application published as EP-A-1215 907 which is incorporated herein by reference.

In an alternative example, there is no transaction server and the seller communicates directly with the buyer via the network.

In another alternative example, both a seller client and a buyer client may be implemented on the same computer.

The invention may also be implemented in a peer to peer network.

In yet another alternative, the there is no transaction server 62. The buyer who has a buyer processor 61 communicates with the seller who has a seller processor 60 via the network 64 to obtain the combined audio data either via the network or an a tape or disc or other recording medium which is sent to the buyer. If the buyer likes the audition signal, the buyer pays the seller for the decryption key(s) either directly or via the financial institution 63 connected to the network. The seller then sends the decryption key(s) to the buyer.

Push Systems and Pull Systems

The transaction systems described with reference to FIG. 17 are "pull" systems in which the buyer requests the seller to transfer the audition signal to the buyer.

The present invention may be used in "push" systems an example of which is a broadcasting system in which audio is transmitted to all potential users. If a user then wishes to acquire the unimpaired audio they then request the issuance of the decryption key(s).

Computer Program Combined with an Audio Signal

In the foregoing examples, the first signal is a compressed and encrypted digital audio signal which is combined with a second audio signal, which is the audition signal. In some examples, the encryption randomises the first signal so that it appears to be noise if it is embedded in the second signal. In other examples, the second signal is compressed and the first signal embedded in auxiliary data space in the compressed audition signal and/or appended to the compressed second signal.

In a development of the invention, the first signal is a computer program which may or may not be compressed and which may or may not be encrypted. This example assumes it is neither compressed nor encrypted. The second signal is an audio signal. The combined signal is recorded on a recording medium, for example a compact disc.

The computer program is:

a) embedded in the second signal (which may or may not be compressed) according to one of the methods described above. In this case the first signal need not be encrypted but preferably it is encrypted. If the computer program is compressed it is losslessly compressed.

Alternatively, the computer program is b) embedded in auxiliary data space in the compressed second signal and/or appended to the end of the compressed second signal according to methods described above. Preferably it is encrypted especially if it is simply appended to the second signal. If the computer program is compressed it is losslessly compressed.

The second signal may be music. The second signal may possibly include an announcement making clear that a computer program is on the disc and giving instructions on how to access it.

The invention claimed is:

1. A method for processing a digital audio signal, the method comprising the steps of:
   providing a digital audio signal representing unimpaired audio information;
   compressing and encrypting said digital audio signal to produce a first compressed and encrypted audio signal, the audio information of which is substantially unimpaired compared to that of the said digital audio signal;
   producing an unencrypted second audio signal; and
   combining said first and second audio signals to produce a combined signal comprising the compressed and encrypted first audio signal and the unencrypted second audio signal, wherein
   said first audio signal occurs as noise in said combined signal; and
   the step of combining the first and second signals comprises embedding the first signal as noise in the second signal.

2. The method according to claim 1 wherein the digital audio signal is losslessly compressed to produce the first audio signal.

3. The method according to claim 1, wherein the step of combining comprises appending at least part of the first signal to the second signal.

4. The method according to claim 1, wherein the step of producing the second signal comprises impairing at least a portion of the digital signal.

5. The method according to claim 3, wherein the step of producing the second signal comprises combining the digital signal with a third signal which impairs at least a portion of the digital signal.

6. The method according to claim 3, further comprising the steps of:
   modulating the third signal; and
   combining the modulated third signal with the digital signal.

7. The method according to claim 1, wherein the step of producing the first signal comprises:
   compressing the digital signal; and
   encrypting the compressed signal without substantially increasing the number of bits of the compressed digital signal.

8. The method according to claim 1, wherein the second signal is a sampled digital signal, each sample having more significant bits (MSBs) and less significant bits (LSBs).

9. The method according to claim 8, wherein the digital signal has a fixed point format.

10. The method according to claim 8, wherein the first signal is combined with the second signal by replacing the LSBs of the second signal with at least some of the bits of the first signal.

11. The method according to claim 10, wherein a predetermined fixed number of LSBs of the second signal are replaced by at least some of the bits of the first signal.

12. The method according to claim 10, wherein, in the combined signal, a ratio of MSBs, representing said second signal, to LSBs, representing the bits of the first signal, is variable.

13. The method according to claim 12, wherein the ratio is dependent on compression applied to the first digital signal.

14. The method according to claim 10, wherein the combined signal includes data indicating which bits of the combined signal are LSBs and which bits are MSBs.

15. The method according to claim 8, further comprising the step of reducing an amount of data in the second signal.

16. The method according to claim 15, comprising the step of reducing a sampling rate of the second signal.

17. The method according to claim 8, further comprising providing a file containing the first signal and a file containing the second signal.

18. The method according to claim 17, wherein a ratio of MSBs, representing the said second signal, to LSBs, representing said first digital signal, is dependent on a number of bits in the files of the first signal and a number of bits of the second signal.

19. The method according to claim 17, wherein the bits of the first signal are distributed over samples of the second signal based on a ratio of the total number of encrypted bits in the encrypted signal file to the total number of samples of the second signal.

20. The method according to claim 19, wherein the ratio is approximated by an integer fraction M/N, and further comprising the steps of:
   selecting groups of N samples; and
   distributing, over the N samples of each group, corresponding sets of M bits.

21. The method according to claim 20, further comprising the steps of:
   scaling a value A of each of the N samples according to $A'[X]=(A[X]/S)*S$ where: X is an ordinal numbering of the samples and equals 0 to N−1; and $S=2^R$ where R is M/N; and
   replacing $A'[X]$ by $A''[X]=A'[X]+V/S^X$ for X>0, and by $A''[0]=A'[0]+\text{mod } S$ for X=0,
   where for each of X=N−1 to 0, V is replaced by $V-V/S^X$, V initially being the value of the M bits when X=N−1.

22. The method according to claim 1, wherein the second signal is a sampled digital signal, each sample having most significant bits (MSBs) and less significant bits (LSBs), and comprising the step of dividing the second signal into blocks each block comprising a plurality of samples.

23. The method according to claim 22, wherein each block of the second signal contains the same predetermined number of samples.

24. The method according to claim 22, further comprising the steps of:
   analysing the signal level of the second signal; and
   setting the number of samples per block based on signal level.

25. The method according to claim 22, wherein the number of samples per block in the second signal varies.

26. The method according to claim 25, further comprising the steps of:
   analysing the signal level of the said second signal; and
   setting the number of samples in a block based on a function of the levels of the signal samples within the block.

27. The method according to claim 22, further comprising providing, in the second signal, data indicating the boundaries of the blocks.

28. The method according to claim 27, wherein, in each block, the first signal is combined with the second signal by replacing the LSBs of the second signal with bits of the first signal and a ratio of MSBs, representing said second signal, to LSBs, representing the bits of the first signal, in each block is a function of the signal levels of the samples of the second signal in the block.

29. The method according to claim 28, wherein the data indicating the block boundaries includes data indicating the number of samples in each block.

30. The method according to claim 1, wherein the step of producing the first signal further comprises the steps of:
   compressing and encrypting the digital audio signal, and wherein at least the step of encrypting comprises:
      selecting sections of the compressed digital audio signal;
      separately encrypting each section; and
      providing data in the first signal indicating the section boundaries.

31. The method according to claim 30, further comprising providing a file containing the digital audio signal to be compressed and encrypted.

32. The method according to claim 31, further comprising the steps of:
   compressing an entirety of the file; and
   encrypting sections of the compressed file.

33. The method according to claim 31, further comprising the steps of:
   selecting sections of the file;
   separately compressing and encrypting each sections; and
   providing each section with data at least identifying the section.

34. The method according to claim 30, further comprising the steps of:
   encrypting at least one section according to one encryption key;
   encrypting at least one other section according to another key; and
   storing data indicating the correspondence between the sections and the keys.

35. The method according to claim 34, wherein the correspondence data is stored in the first digital signal.

36. The method according to 30, wherein the data indicating the section boundaries identifies the data included in the sections.

37. The method according to claim 1, further comprising the step of compressing at least part of the second signal and wherein the combining step comprises combining the first signal with the compressed second signal.

38. The method according to claim 37, wherein the compressed second signal comprises auxiliary data space within the data structure thereof, and comprising the step of placing at least some of the bits of the first digital signal in the said auxiliary data space of the compressed second signal.

39. The method according to claim 37, wherein the second signal is compressed according to an MPEG standard.

40. The method according to claim 8, wherein the step of producing the first digital signal comprises:
   receiving the digital signal from a streaming source;
   dividing the digital stream into segments each comprising a predetermined number of samples; and
   separately compressing and encrypting each segment.

41. The method according to claim 40, further comprising:
   encrypting all sections according to the same key or encrypting at least one section according to one encryption key, and at least one other section is encrypted according to another key; and
   storing data indicating the correspondence between the sections and the keys.

42. The method according to claim 41, wherein the correspondence data is stored in the first digital signal.

43. The method according to claim 40, wherein the first signal is combined with the second signal by replacing, in samples of the second signal, the LSBs of the second signal with the bits of the first signal.

44. The method according to claim 43, wherein a predetermined fixed number of LSBs of a sample of the second signal are replaced by the bits of the first signal.

45. The method according to claim 44, wherein, in samples of the combined signal, the ratio of MSBs, representing the second signal, to LSBs, representing the bits of the first signal, is variable.

46. The method according to claim 45, wherein the ratio is dependent on an amount of compression applied to the first signal.

47. The method according to claim 43, wherein the combined signal includes data indicating which bits of the combined signal are LSBs and which bits are MSBs.

48. The method according to claim 43, further comprising appending at least part of the first digital signal to the second signal.

49. The method according to claim 40, further comprising the steps of:
    selecting groups of N samples; and
    distributing over the N samples of each group corresponding sets of M bits of the first signal,
    where the ratio M/N is an integer fraction.

50. The method according to claim 49, further comprising the steps of:
    scaling a value A of each of the N samples according to $A'[X]=(A[X]/S)*S$ where: X is an ordinal numbering of the samples and equals 0 to N−1; and $S=2^R$ where R is M/N; and
    replacing $A'[X]$ by $A''[X]=A'[X]+V/S^X$ for X>0, and by $A''[0]=A'[0]+\mod S$ for X=0,
    where for each of X=N−1 to 0, V is replaced by $V-V/S^X$, V initially being the value of the M bits when X=N−1.

51. The method according to claim 1, further comprising the step of recording the combined signal on a recording medium.

52. The method according to claim 1, further comprising providing the combined signal to a signal distribution system.

53. The method according to claim 1, further comprising providing the combined signal to a transmission system.

54. A recording medium including instructions that when run on a data processor causes the data processor to implement the method of claim 1.

55. A recording medium according to claim 54, wherein the recording medium includes one of a tape and a disc.

56. An apparatus comprising a processor programmed to execute the method of claim 1.

57. A system comprising at least first and second processors, the system being adapted to execute a method of transferring a digital signal representing content from the first processor to the second processor, the method comprising the steps of:
    using the first processor to implement the method of claim 1 to produce the combined signal and to associate an identifier with the combined signal for identifying the combined signal;
    storing the identifier;
    transferring the combined signal to the second processor;
    at the second processor, deriving the identifier associated with the combined signal;
    transferring to the second processor, at least one key associated with the said identifier, based on one or more predetermined conditions for decrypting the encrypted first signal; and
    utilizing the second processor to separate the first signal from the second signal and to restore the first signal.

58. A system comprising a transaction server and at least first and second clients, the system being adapted to execute a method of transferring a digital signal representing content from the first client to the second client, the method comprising the steps of:
    using the first client to implement the method of claim 1 to produce the combined signal and associating an identifier with the combined signal for identifying the combined signal;
    providing, to the transaction server, the identifier and at least one key for decrypting the encrypted signal and storing, in the transaction server, the identifier and the at least one key;
    transferring the combined signal to the second client;
    deriving the identifier associated with the combined signal;
    transferring the identifier from the second client to the transaction server;
    transferring from the transaction server to the second client at least one key associated with the said identifier, based on one or more predetermined conditions, for decrypting the encrypted first signal; and
    using the second client to separate the first signal from the second signal, and using the decryption key decrypt the first signal, decompress the decrypted to restore the digital signal.

59. The system according to claim 57, wherein the first signal includes computer readable instructions.

60. An apparatus for processing a digital signal, the apparatus comprising:
    a first input for receiving a digital audio signal representing complete and unimpaired audio information;
    a compressor and encryptor arranged to compress and encrypt the digital audio signal arranged to produce a compressed and encrypted first audio signal, the audio information of which is substantially unimpaired compared to that of the digital audio signal;
    a second input for receiving an unencrypted second audio signal; and
    a signal combiner arranged to combine the first and the second audio signals to produce a combined signal comprising the compressed and encrypted audio signal and the unencrypted second signal, wherein:
    the first audio signal occurs as noise in the combined signal, and
    the signal combiner is operable to embed the first signal as noise in the second signal.

61. The apparatus according to claim 60, further comprising a first signal producer operable to produce the digital audio signal representing unimpaired audio information.

62. The apparatus according to claim 60, further comprising a second signal producer operable to produce the unencrypted second audio signal.

63. The apparatus according to claim 62, wherein the second signal producer further comprises a signal impairing for impairing the digital audio signal to produce said second signal.

64. The apparatus according to claim 63, wherein the second signal producer comprises a second combiner for combining the digital audio signal with a degradation signal that degrades the digital audio signal to produce the second signal.

65. The apparatus according to claim 64, further comprising:
    a modulator for modulating the degradation signal, and
    wherein the second combiner is arranged to combine the modulated degradation signal with the digital audio signal to produce the second signal.

66. The apparatus according to claim 65, wherein the second signal is a sampled digital signal, each sample having most significant bits (MBSs) and less significant bits (LSBs) and wherein the signal combiner is operable to combine the first signal with the second signal by replacing the LSBs of the second signal with bits of the first signal.

67. The apparatus according to claim 66, wherein the signal combiner is arranged to control a ratio of the number of LSBs to MSBs according to the compression ratio achieved by the compressor.

68. The apparatus according to claim 66, wherein the signal combiner is adapted to append at least part of the first digital signal to the second signal.

69. The apparatus according to claim 60, wherein the signal combiner is arranged to distribute the bits of the first signal over samples of the second signal based on a ratio of the total number of encrypted bits in the encrypted first audio signal to the total number of samples of the second signal.

70. The apparatus according to claim 69, wherein the ratio is approximated by an integer fraction M/N where M/N is less than the ratio, and further comprising the step of:

selecting groups of N samples and distributing over the N samples of each group corresponding sets of M bits.

71. The apparatus according to claim 70, wherein the signal combiner is arranged to implement the steps of:

scaling a value A of each of the N samples according to $A'[X]=(A[X]/S)*S$ where: X is an ordinal numbering of the samples and equals 0 to N−1; and $S=2^R$ where R is M/N; and replacing $A'[X]$ by $A''[X]=A'[X]+V/S^X$ for X>0, and by $A''[0]=A'[0]+\text{mod } S$ for X=0, where for each of X=N−1 to 0, V is replaced by $V-V/S^X$, V initially being the value of the M bits when X=N−1.

72. The apparatus according to claim 60, further comprising a second compressor operable to compress the second signal, the signal combiner being arranged to combine the first signal with the compressed second signal.

73. The apparatus according to claim 72, wherein the compression ratio of the second compressor is dependent on the compression ratio achieved by the compressor.

74. The apparatus according to claim 60, wherein the compressor and encryptor are arranged to produce a losslessly compressed and encrypted first audio signal.

75. A method of recovering a first signal from a combination of a first, compressed and encrypted, digital audio signal combined with a second signal, in which the audio information of the first audio signal is substantially unimpaired;

the first audio signal occurs as noise when combined as a combination with the second signal;

the first audio signal is embedded as noise in the second signal; and the method comprises the steps of:

separating the first audio signal from the combination;

decrypting the separated first signal; and decompressing the decrypted first signal to recover the substantially unimpaired audio information.

76. The method according to claim 75, wherein the first signal is represented by Less Significant Bits (LSBs) of the combined signal and the second signal is represented by Most Significant Bits (MSBs) of the combined signal and further comprising the step of discarding the MSBs to separate the first signal from the second signal.

77. The method according to claim 76, wherein the first signal is appended to the second signal and further comprising the step of discarding the second signal.

78. The method according to claim 75, wherein the second signal is a compressed signal, compressed according to a format which has auxiliary data space in which the first signal is placed, and further comprising the step of extracting the first signal from the auxiliary data space.

79. The method according to claim 75, wherein the first and second signals are combined, wherein the recovering method comprises, for each group of N samples, the steps of setting X=0, setting V=0, and replacing V by $V=V+A'[X]\text{mod}S*S^X$ for each of X=0 to N−1.

80. A recording medium including instructions that when run on a data processor implements the method of claim 75.

81. A recording medium according to claim 80, wherein the recording medium includes one of a tape and a disc.

82. A processing apparatus comprising a processor programmed to implement the method of claim 75.

83. A method of processing a digital signal comprising the steps of:

providing a first digital signal representing first information;

providing a second digital signal; and embedding the first signal in the second signal by selecting groups of N samples and distributing over the N samples of each group corresponding sets of M samples of the first signal, where the ratio M/N is an integer fraction, further comprising the steps of:

scaling a value A of each of the N samples according to $A'[X]=(A[X]/S)*S$ where: X is an ordinal numbering of the samples and equals 0 to N−1; and $S=2^R$ where R is M/N; and replacing $A'[X]$ by $A''[X]=A'[X]+V/S^X$ for X>0, and by $A''[0]=A'[0]+\text{mod } S$ for X=0, where for each of X=N−1 to 0, V is replaced by $V-V/S^X$, V initially being the value of the M bits when X=N−1.

84. The method according to claim 83, wherein the second signal is an audio signal.

85. An apparatus comprising a processor programmed to execute the method of claim 83.

86. A non-transitory computer readable medium having recorded thereon instructions that when run on a computer or computer system, implements the method of claim 83.

87. A non-transitory computer readable medium according to claim 86 comprising at least one of a tape and a disc.

* * * * *